under 35 U.S.C. 154(b) by 1499 days.

United States Patent
Kain et al.

(10) Patent No.: US 10,395,308 B1
(45) Date of Patent: Aug. 27, 2019

(54) SYSTEMS AND METHODS FOR DYNAMIC DISPLAY OF SYNTHETIC REFERENCE STRUCTURE

(75) Inventors: Gary Kain, Great Falls, VA (US); Eknath Belbase, Washington, DC (US); Aaron Pas, Washington, DC (US); Indy Weerasinghe, Silver Spring, MD (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 1499 days.

(21) Appl. No.: 12/267,445

(22) Filed: Nov. 7, 2008

Related U.S. Application Data

(60) Provisional application No. 60/996,302, filed on Nov. 9, 2007.

(51) Int. Cl.
*G06Q 40/00* (2012.01)
*G06Q 40/02* (2012.01)
*G06Q 40/08* (2012.01)

(52) U.S. Cl.
CPC .................. *G06Q 40/00* (2013.01)

(58) Field of Classification Search
CPC .... G06Q 10/0635; G06Q 40/00; G06Q 40/08; G06Q 40/02; G06Q 40/04; G06Q 40/06; G06Q 40/025
USPC ........................ 705/35–38, 4, 36 R
See application file for complete search history.

(56) References Cited

U.S. PATENT DOCUMENTS

| | | | |
|---|---|---|---|
| 7,987,124 B1* | 7/2011 | Holden et al. | 705/35 |
| 2003/0208431 A1* | 11/2003 | Raynes et al. | 705/36 |
| 2006/0271472 A1* | 11/2006 | Cagan | 705/38 |
| 2007/0118458 A1* | 5/2007 | Lahongrais | 705/37 |

(Continued)

OTHER PUBLICATIONS

First Tuesday Journal Online, Beneficiary's profits on foreclosure, Jun. 6, 2007, http://firsttuesdayjournal.com/beneficiarys-profits-on-foreclosure/.*

(Continued)

*Primary Examiner* — Hao Fu
(74) *Attorney, Agent, or Firm* — Finnegan, Henderson, Farabow, Garrett & Dunner LLP

(57) ABSTRACT

Systems, methods, and computer-readable media are disclosed for using a synthetic reference structure to determine if an obligation is triggered. An exemplary method includes storing data reflecting a plurality of secured loans, each of the secured loans being secured by collateral and each of the secured loans having an outstanding balance, calculating a combined value for the secured loans by totaling the outstanding balances, storing the synthetic reference structure based on the secured loans, the synthetic reference structure having a plurality of tranches, each of the tranches in the plurality of tranches having a value for triggering an obligation, receiving information indicating that a credit event has occurred for a loan in the plurality of secured loans, calculating a loss amount for the loan, determining whether the loss amount causes an aggregation of losses to exceed the value for triggering the obligation associated with a tranche in the plurality of tranches, and, if the aggregation of losses exceeds the value for triggering the obligation, then demanding a payment based on the obligation associated with the tranche.

21 Claims, 7 Drawing Sheets

(56) References Cited

U.S. PATENT DOCUMENTS

2008/0154789 A1\* 6/2008 Lai et al. .................... 705/36 R
2008/0243678 A1\* 10/2008 Hooley et al. .................. 705/38

OTHER PUBLICATIONS

InnoVest Resource Management's Foreclosure Forum, Assessed Values Are Meaningless, Oct. 2002, http://www.foreclosureforum.com/articles/0210assessvalues.html.\*

\* cited by examiner

400

| | Documentation Type - Assets Verified? | Documentation type - Employment Verified? | Documentation Type - Income Verified? | % Combined LTV | Number of Borrowers | Loan Purpose | Initial Interest Only Period |
|---|---|---|---|---|---|---|---|
| Loan 1 | Y | Y | Y | 50 | 2 | P | 0 |
| Loan 2 | N | N | N | 90 | 1 | N | 0 |
| Loan 3 | Y | N | N | 80 | 1 | C | 5 |
| Loan 4 | N | Y | Y | 35 | 3 | C | 5 |
| ... | | | | | | | |
| Loan N-1 | | | | | | | |
| Loan N | | | | | | | |

| | First Time Home Buyer Flag | % PMI | % DTI | MSA | CBSA | TPO |
|---|---|---|---|---|---|---|
| Loan 1 | N | 0 | 18 | 4845 | 19265 | No |
| Loan 2 | Y | 10 | 48 | 4845 | 19265 | Yes |
| Loan 3 | Y | 10 | 32 | 4892 | 19299 | Yes |
| Loan 4 | N | 20 | 0.4 | 4892 | 19299 | No |
| ... | | | | | | |
| Loan N-1 | | | | | | |
| Loan N | | | | | | |

| | Balance | Coupon % | State | Type | Original Maturity (yrs) | Remaining Months to Maturity | Original LTV % |
|---|---|---|---|---|---|---|---|
| Loan 1 | 100,000 | 5 | TX | Fixed | 30 | 120 | 80 |
| Loan 2 | 200,000 | 10 | TX | Fixed | 30 | 240 | 90 |
| Loan 3 | 300,000 | 5 | NV | ARM | 30 | 120 | 90 |
| Loan 4 | 150,000 | 5 | NV | ARM | 30 | 240 | 100 |
| ... | | | | | | | |
| Loan N-1 | | | | | | | |
| Loan N | | | | | | | |

| | Index | Fixed Term | Cap % | Floor | Reset Term | Max Change |
|---|---|---|---|---|---|---|
| Loan 3 | LIBOR | 2 years | 10 | 4% | 1 yr | 0.25 |
| Loan 4 | LIBOR | 5 years | 8 | none | 2 yrs | 0.5 |
| ... | | | | | | |
| Loan N | | | | | | |

| | Group 1 | Group 2 |
|---|---|---|
| | Loan 1 | Loan 3 |
| | Loan 2 | Loan 4 |
| | Loan 42 | Loan 37 |
| Loans | Loan 43 | Loan 56 |
| | ... | ... |
| | Loan N-1 | Loan N |
| Total Initial Balance | 1,000,000,000 | 1,000,000,000 |
| Losses | 0 | 0 |

500-1

| | Group 1 | Group 2 |
|---|---|---|
| | Loan 1 | Loan 3 |
| | Loan 2 | Loan 4 |
| | Loan 42 | Loan 37 |
| Loans | Loan 43 | Loan 56 |
| | ... | ... |
| | Loan N-1 | Loan N |
| Total Initial Balance | $ 1,000,000,000.00 | $ 1,000,000,000.00 |
| Losses | $ 200,000.00 | $ - |

500-2

| | Group 1 | Group 2 |
|---|---|---|
| | Loan 1 | Loan 3 |
| Loans | ... | ... |
| | Loan N-1 | Loan N |
| Total Initial Balance | $ 1,000,000,000.00 | $ 1,000,000,000.00 |
| Losses | $ 4,950,000.00 | $ - |

500-3

| | Group 1 | Group 2 |
|---|---|---|
| | Loan 1 | Loan 3 |
| Loans | ... | ... |
| | Loan N-1 | Loan N |
| Total Initial Balance | $ 1,000,000,000.00 | $ 1,000,000,000.00 |
| Losses | $ 5,050,000.00 | $ - |

| | Documentation Type - Assets Verified? | Documentation Type - Employment Verified? | Documentation Type - Income Verified? | % Combined LTV | Number of Borrowers | Loan Purpose | Initial Interest Only Period |
|---|---|---|---|---|---|---|---|
| Group 1 | 87% | 92% | 58% | 68 | 20 | 50/25/25 | n/a |
| Group 2 | 48% | 17% | 16% | 95 | 60 | 70/15/15 | 5 |
| ... | | | | | | | |
| Group N | | | | | | | |

| | First Time Home Buyer Flag | % PMI | % DTI | MSA | CBSA | TPO |
|---|---|---|---|---|---|---|
| Group 1 | 16% | 5% | 30% | 4845 | 19265 | 16% |
| Group 2 | 80% | 17% | 40% | 4892 | 19299 | 70% |
| ... | | | | | | |
| Group N | | | | | | |

| | Balance | Coupon % | State | Type | Original Maturity (yrs) | Remaining Months to Maturity | Original LTV % |
|---|---|---|---|---|---|---|---|
| Group 1 | 100,000 | 5 | TX | Fixed | 30 | 120 | 80 |
| Group 2 | 200,000 | 10 | NV | ARM | 30 | 240 | 90 |
| ... | | | | | | | |
| Group N | | | | | | | |
| | | | | | | | |
| | | | | | | | |
| | | | | | | | |

| | Index | Fixed Term | Cap % | Floor | Reset Term | Max Change |
|---|---|---|---|---|---|---|
| Group 1 | | | | | | |
| Group 2 | LIBOR | 5 years | 7 | 3 | 1 | 0.25 |
| ... | | | | | | |
| Group N | | | | | | |

FIG. 6

SYSTEMS AND METHODS FOR DYNAMIC DISPLAY OF SYNTHETIC REFERENCE STRUCTURE

CROSS REFERENCE TO RELATED APPLICATION(S)

This application claims the benefit of priority from U.S. Provisional Application No. 60/996,302, entitled "SYSTEMS AND METHODS OF FACILITATING AN AGENCY CREDIT DEFAULT SWAP TRANSACTION REFERENCING MORTGAGE-BACKED SECURITIES," filed Nov. 9, 2007, the disclosure of which is expressly incorporated herein by reference to its entirety.

BACKGROUND

I. Technical Field

The present invention generally relates to the field of secured lending. More particularly, and without limitation, the invention relates to systems and methods for determining if financial obligations are triggered for third parties when borrowers do not meet their obligations to secured lenders. Using a synthetic reference structure, it is possible to determine whether a failure of a borrower to meet a payment obligation also triggers an obligation for the third party to pay the secured lender.

II. Background Information

Loans can be split into two broad categories, secured loans and unsecured loans. In an unsecured loan, the borrower is obligated to pay back the loan, but does not offer any collateral to secure the loan. In a secured loan, the borrower is not only personally liable for the loan, but offers collateral to secure the loan. In the event a borrower defaults on a secured loan, the borrower is required to transfer ownership of the collateral to the lender, or the lender can force a sale of the collateral to collect the debt.

In the mortgage industry, the collateral is usually a house or other piece of real property. In the event of a default by a borrower, the lender can foreclose on the real property and force a sale. If the foreclosure sale price is at least as much as the outstanding balance on the loan plus any associated costs, the lender is made whole, and any excess amount is returned to the borrower. However, if the foreclosure sale is less than the outstanding balance and costs, the lender can take a loss.

When market conditions cause collateral values to fall quickly, secured lenders can be in a precarious financial situation. For example, if the value of a home falls below the outstanding balance on a mortgage, the borrower has "negative equity." In these circumstances there is often very little incentive to pay back the full amount of the loan, particularly for those borrowers who already have poor credit ratings. However, because the value of the home is lower than the outstanding balance, the lender cannot be made whole by simply foreclosing on the property.

Lenders have some options for insulating themselves from the impact of adverse market conditions and falling collateral values. One option in the housing market is to require borrowers to purchase mortgage insurance. Mortgage insurance guarantees the lender will be paid part of the mortgage even if the borrower defaults. Whether mortgage insurance is required on a given mortgage is usually based on the loan-to-value (LTV) ratio of the mortgage at the time the loan is made. Usually, borrowers with greater than 80% LTV at the time the mortgage loan is disbursed will be required to pay mortgage insurance.

Falling collateral values can place lenders in a situation where mortgage insurance is not available to help manage their risk with mortgages. For example, if a number of loans were originally made without mortgage insurance at 80% LTV, the lender cannot subsequently require the borrower to start paying mortgage insurance simply because the value of the property declines and the LTV increases above 80%.

Another option for lenders to mitigate their risk of losses from defaulting borrowers is called a "credit default swap" or "CDS." A CDS is a contract where the lender pays a premium to a protection seller. The protection seller agrees to reimburse the lender in the event of a loss incurred in some reference obligation. For example, if the reference obligation is a mortgage, the lender might pay the protection seller a monthly premium if the protection seller agrees to reimburse the lender for any losses should the lender have to foreclose on the property.

A CDS contract can be settled in one of two ways. The first is called a "physical" settlement. In a physical settlement, the lender who incurs the loss actually transfers the underlying property to the protection seller for the remaining balance on the mortgage, or some negotiated percentage thereof. The second way to settle a CDS contract is a "cash settlement" based on the foreclosure proceeds—instead of transferring the property from the lender to the protection seller, the protection seller simply pays the difference between the remaining balance on the mortgage note and the value of the property recovered at foreclosure.

While CDS contracts can serve to mitigate risk for a lender, traditional CDS contracts have certain disadvantages. First, a traditional CDS obligation is based on the amount obtained at a foreclosure sale of a property. The foreclosure process can take a very long time, depending on the jurisdiction where the property is located, the disposition of the borrower to fight the foreclosure, and other factors. Therefore, it can take a very long time for the lender to be reimbursed.

Another disadvantage of a traditional CDS contract is that the lender may not have sufficient incentives to obtain full value for the foreclosed property. For example, a lender who executes a CDS contract against a property may not care whether the property sells at foreclosure for a reasonable price, because the protection seller is contractually obligated to reimburse them for whatever loss they incur. Thus, the existence of CDS protection on a given property may reduce the incentive for the lender to pursue loss mitigation efforts to reduce the costs from foreclosing on the property.

A further disadvantage of a traditional CDS contract is that lenders' incentives to foreclose can be dependent on their CDS position rather than the actual likelihood of borrower repayment. Because lenders have the power to determine whether or not to foreclose on a given property, a lender may be more inclined to foreclose on properties where they have CDS protection rather than properties where they are more exposed to losses from foreclosure.

In other circumstances, lenders may have greater than 100% coverage on a particular property—in other words, the lender would stand to actually profit more by foreclosing on a property than they would if they were simply repaid by the borrower. In this circumstance, the lender might consider allowing losses to accumulate on a given property rather than foreclosing as soon as possible, because the more losses they take on the property, the more they stand to earn from their CDS coverage.

Thus, it is desirable to provide lenders with the ability to reduce their exposure to losses from defaulted secured loans, without reducing the incentive for the lenders to take loss mitigation efforts. It is further desirable to provide lenders with the ability to accelerate the triggering of CDS obligations without having to wait for the results of a foreclosure sale.

SUMMARY

Consistent with an embodiment of the invention, a computer-implemented method is provided for using a synthetic reference structure to determine if an obligation is triggered. The method may include: storing data reflecting a plurality of secured loans, each of the secured loans being secured by collateral and each of the secured loans having an outstanding balance, calculating a combined value for the secured loans by totaling the outstanding balances, storing the synthetic reference structure based on the secured loans, the synthetic reference structure having a plurality of tranches, each of the tranches in the plurality of tranches having a value for triggering an obligation, receiving information indicating that a credit event has occurred for a loan in the plurality of secured loans, calculating a loss amount for the loan, determining whether the loss amount causes an aggregation of losses to exceed the value for triggering the obligation associated with a tranche in the plurality of tranches, and, if the aggregation of losses exceeds the value for triggering the obligation, then demanding a payment based on the obligation associated with the tranche.

Consistent with an embodiment of the invention, a system comprising an obligation engine and a processor for executing the obligation engine is provided. The obligation engine may be configured to: store data reflecting a plurality of secured loans, each of the secured loans being secured by collateral and each of the secured loans having an outstanding balance, calculate a combined value for the secured loans by totaling the outstanding balances, store the synthetic reference structure based on the secured loans, the synthetic reference structure having a plurality of tranches, each of the tranches in the plurality of tranches having a value for triggering an obligation, receive information indicating that a credit event has occurred for a loan in the plurality of secured loans, calculate a loss amount for the loan, determine whether the loss amount causes an aggregation of losses to exceed the value for triggering the obligation associated with a tranche in the plurality of tranches, and, if the aggregation of losses exceeds the value for triggering the obligation, then demand a payment based on the obligation associated with the tranche.

Consistent with an embodiment of the invention, a computer readable medium is provided comprising instructions for causing a computer to execute a method for using a synthetic reference structure to determine if an obligation is triggered. The method may include: storing data reflecting a plurality of secured loans, each of the secured loans being secured by collateral and each of the secured loans having an outstanding balance, calculating a combined value for the secured loans by totaling the outstanding balances, storing the synthetic reference structure based on the secured loans, the synthetic reference structure having a plurality of tranches, each of the tranches in the plurality of tranches having a value for triggering an obligation, receiving information indicating that a credit event has occurred for a loan in the plurality of secured loans, calculating a loss amount for the loan, determining whether the loss amount causes an aggregation of losses to exceed the value for triggering the obligation associated with a tranche in the plurality of tranches, and, if the aggregation of losses exceeds the value for triggering the obligation, then demanding a payment based on the obligation associated with the tranche.

Consistent with an embodiment of the invention, a computer-implemented method of facilitating a credit default swap (CDS) transaction referenced against the performance of agency mortgages is provided. The method may include: a) providing, using a processor, loan level disclosure for a plurality of agency conforming mortgages; b) creating, using a processor, a synthetic reference structure to emulate the performance of a pool of the agency conforming mortgages; c) applying, using a processor, one or more ratings to the synthetic reference structure using structured security ratings obtained from independent credit rating agencies; d) providing, using a processor, loan level performance data on the synthetic reference structure; e) executing, using a processor, a credit default swap (CDS) contract using the synthetic reference structure as a reference obligation for a transaction based on the CDS contract; and f) calculating, using a processor, a credit loss for the synthetic reference structure using a predefined loss formula when a delinquent loan is removed from an underlying pool of loans, the credit loss being used, in part, to determine whether a loss payment obligation under the credit default swap contract is triggered.

Consistent with an embodiment of the invention, a system comprising a processor is provided. The processor may be configured to: a) provide loan level disclosure for a plurality of agency conforming mortgages; b) create a synthetic reference structure to emulate the performance of a pool of the agency conforming mortgages; c) apply one or more ratings to the synthetic reference structure using structured security ratings obtained from independent credit rating agencies; d) provide loan level performance data on the synthetic reference structure; e) execute a credit default swap (CDS) contract using the synthetic reference structure as a reference obligation for a transaction based on the CDS contract; and f) calculate a credit loss for the synthetic reference structure using a predefined loss formula when a delinquent loan is removed from an underlying pool of loans, the credit loss being used, in part, to determine whether a loss payment obligation under the credit default swap contract is triggered.

Consistent with an embodiment of the invention, a computer readable medium is provided comprising instructions for causing a computer to execute a method of facilitating a credit default swap (CDS) transaction referenced against the performance of agency mortgages. The method may include: a) providing, using a processor, loan level disclosure for a plurality of agency conforming mortgages; b) creating, using a processor, a synthetic reference structure to emulate the performance of a pool of the agency conforming mortgages; c) applying, using a processor, one or more ratings to the synthetic reference structure using structured security ratings obtained from independent credit rating agencies; d) providing, using a processor, loan level performance data on the synthetic reference structure; e) executing, using a processor, a credit default swap (CDS) contract using the synthetic reference structure as a reference obligation for a transaction based on the CDS contract; and f) calculating, using a processor, a credit loss for the synthetic reference structure using a predefined loss formula when a delinquent loan is removed from an underlying pool of loans, the credit loss being used, in part, to determine whether a loss payment obligation under the credit default swap contract is triggered.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 4 illustrates an exemplary data structure, consistent with certain embodiments of the invention;

FIG. 5 illustrates an exemplary data structure, consistent with certain embodiments of the invention;

FIG. 6 illustrates an exemplary data structure, consistent with certain embodiments of the invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
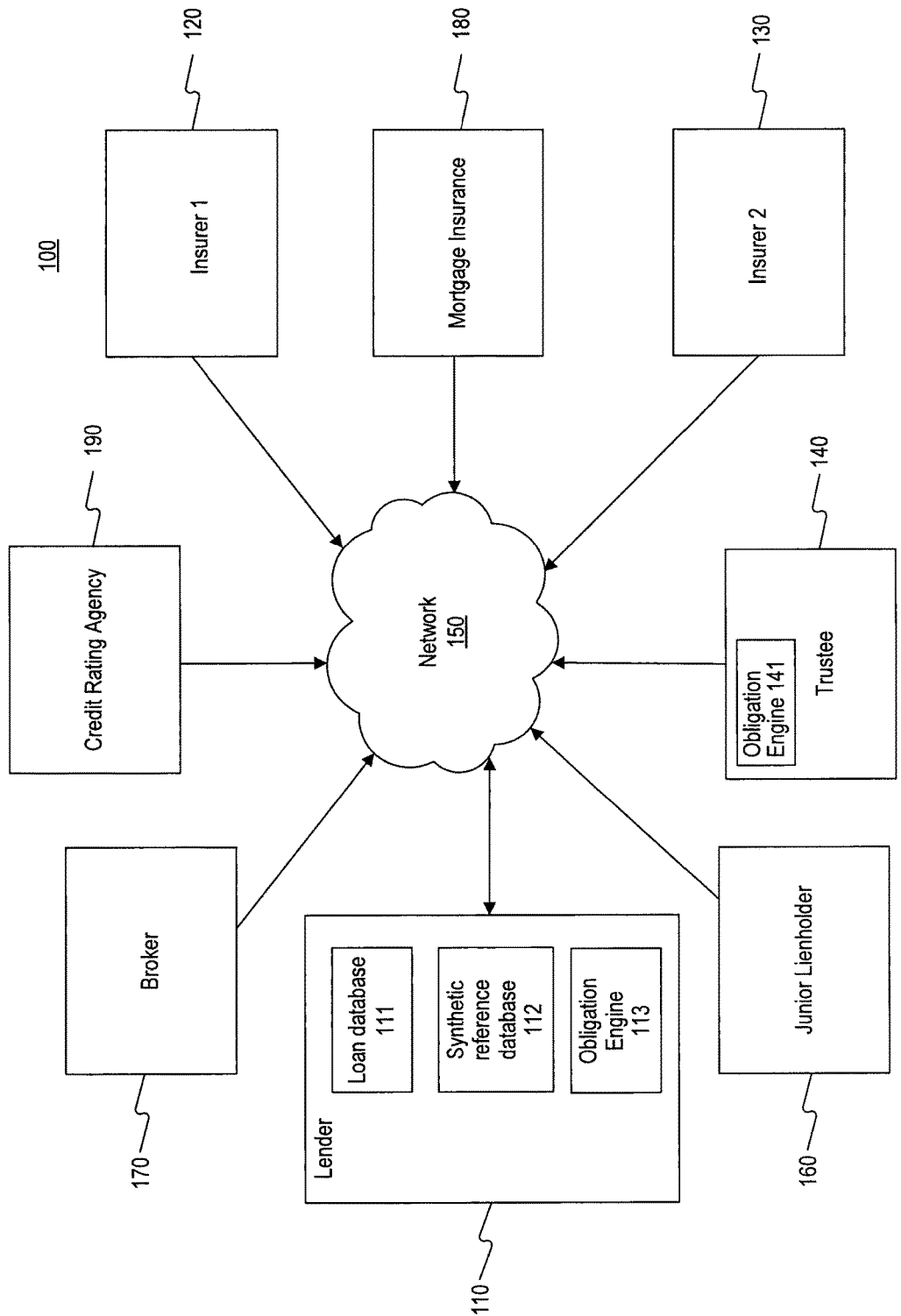
FIG. 1 is a block diagram of an exemplary system, consistent with an embodiment of the invention.

FIG. 1 illustrates a block diagram of an exemplary system environment that comprises a system 100, consistent with an embodiment of the invention. System 100 may include a lender terminal 110. Lender terminal 110 may be operated by a lender, and may communicate with insurer 1 terminal 120 and insurer 2 terminal 130 over network 150. Insurer terminals 120 and 130 may be operated by an insurer 1 and an insurer 2, respectively. Lender terminal 110 may store loan data in loan database 111, and one or more synthetic reference structures in synthetic reference database 112. Lender terminal 110 may also include an obligation engine 113. As discussed below, obligation engine 113 may be used to implement a method for determining whether an obligation is triggered by a credit event. In some embodiments, obligation engine 113 may comprise software executing on a processor, or hardware such as an ASIC or FPGA.

Although FIG. 1 shows a particular number and arrangement of components, other arrangements and numbers of components could be used to implement embodiments of the invention. For example, there may be various numbers of lender terminals 110 and/or insurer terminals 120/130. Lender terminal 110, insurer 1 terminal 120, and insurer 2 terminal 130 may be general-purpose computers including one or more processors, memory, and storage devices. Network 150 may be a wired or wireless network or any combination thereof, such as a home or office LAN in communication with the Internet.

FIG. 1 also illustrates a number of other terminals connected to network 150, e.g. trustee terminal 140, junior lienholder terminal 160, broker terminal 170, mortgage insurance terminal 180, and credit rating agency terminal 190. Each of these terminals may also be general purpose computers. Each of the terminals in FIG. 1 may include conventional software such as web browsers for displaying data received from other terminals connected to network 150.

Figure 2:
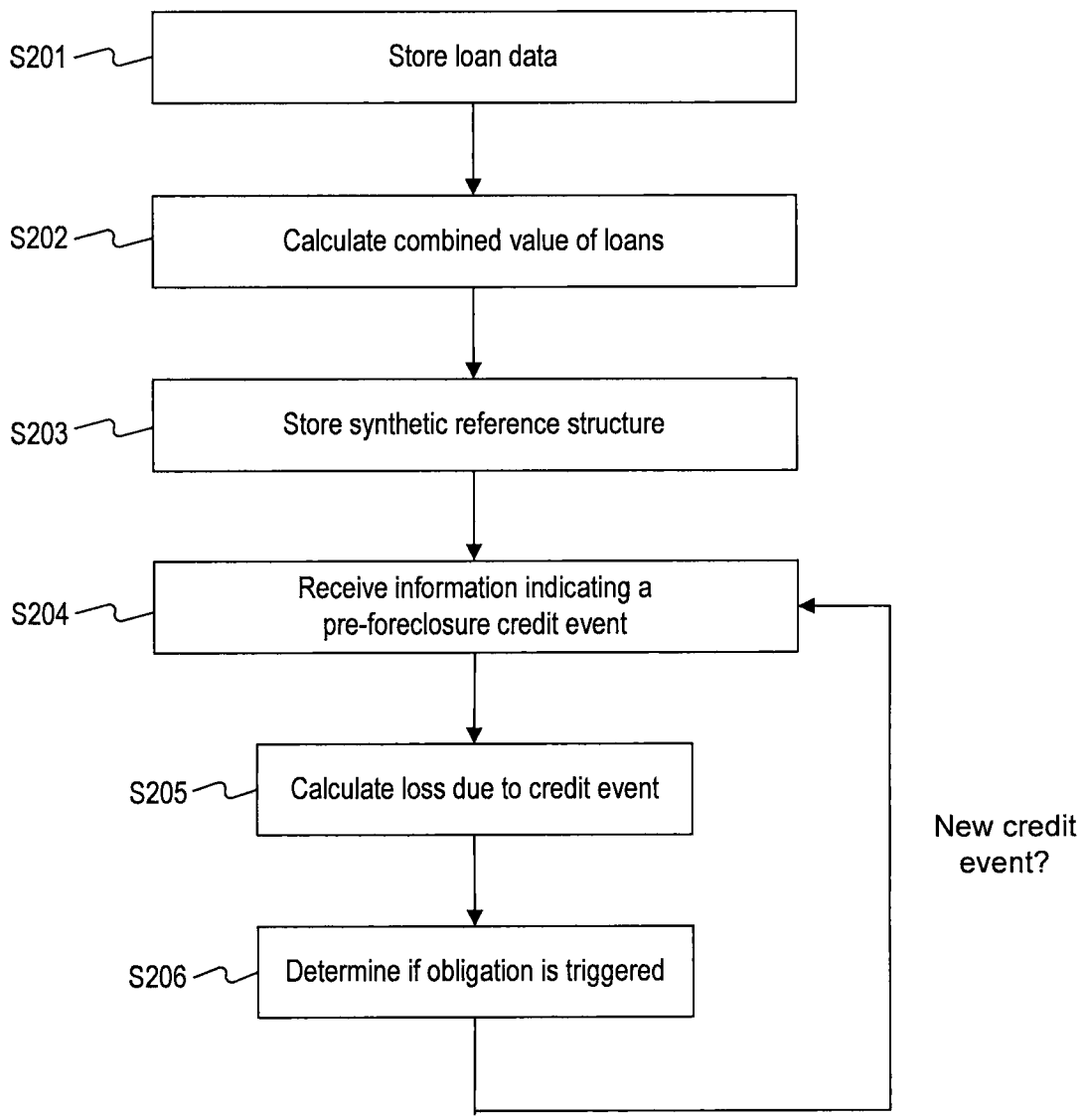
FIG. 2 is a flowchart of an exemplary method, consistent with an embodiment of the invention.

FIG. 2 is an exemplary flowchart of a method 200, consistent with an embodiment of the invention. FIG. 2 illustrates an exemplary method for using a synthetic reference structure to determine if an obligation is triggered. In some embodiments, method 200 may be performed by obligation engine 113.

As shown in FIG. 2, the method starts with step S201 by storing loan data for a plurality of secured loans. Each of the secured loans may be secured by collateral, and each of the secured loans may have an outstanding balance. In one embodiment, the collateral for each loan is real property, and the loan is secured by a mortgage on the property. Other types of collateral and loans may be used in other embodiments.

The loan data can be stored, for example, on lender terminal 110 in loan database 111. As shown in the exemplary embodiment of FIG. 4, the loan data may be organized as a loan table 400, and a number of attributes can be stored for each of a plurality of mortgages in loan table 400. Loan table 400 illustrates loans represented by rows, with each column representing an attribute. Loan table 400 may store attributes for any number of loans. Each of the loans has attributes stored in columns such as "documentation type—assets verified?" and "loan purpose." The meaning of each of these exemplary attributes will be described in more detail below.

As shown in FIG. 5, in one embodiment, loans may be grouped together in a table 500 based on the attributes in loan table 400. Table 500 may be periodically updated while performing method 200. FIG. 5 illustrates table 500 at 4 different points in time, e.g. table 500-1, 500-2, 500-3, and 500-4, to reflect updates to table 500 while performing method 200. When necessary to refer to the contents of table 500 at a particular point in time, the suffix -1, -2, -3, or -4 will be appended to table 500. When generally referring to table 500, no suffix will be appended.

Table 500 illustrates two groups of loans. Group 1 includes loan 1, loan 2, and a number of other loans. In the disclosed embodiment, loans 1 and 2 are in group 1 with other loans of same loan type (e.g., fixed rate) and original maturity (e.g., 30 year), such as a group of other 30-year fixed rate mortgages. Loans in a group may have other attributes in common, such as originating in the state of Texas. Similar common attribute fields exist for group 2, which includes loans 3 and 4. For example, group 2 may comprise only 30-year ARM loans with a fixed term of between 2 and 5 years, originated in the state of Nevada.

Referring again to FIG. 2, at step S202, method 200 calculates a combined value for group 1 by adding together the outstanding balances for the loans in group 1. For example, a group consisting solely of loans 1 and 2 from FIG. 4 would have an outstanding balance of $300,000, e.g. $100,000 for loan 1 and $200,000 for loan 2. In the example shown in FIG. 5, group 1 consists of loans with a total outstanding balance of one billion dollars, e.g. an average of 1 million dollars per loan. In one embodiment, method 200 stores the calculated combined value for group 1 in the total initial balance field of table 500-1.

Figure 3:
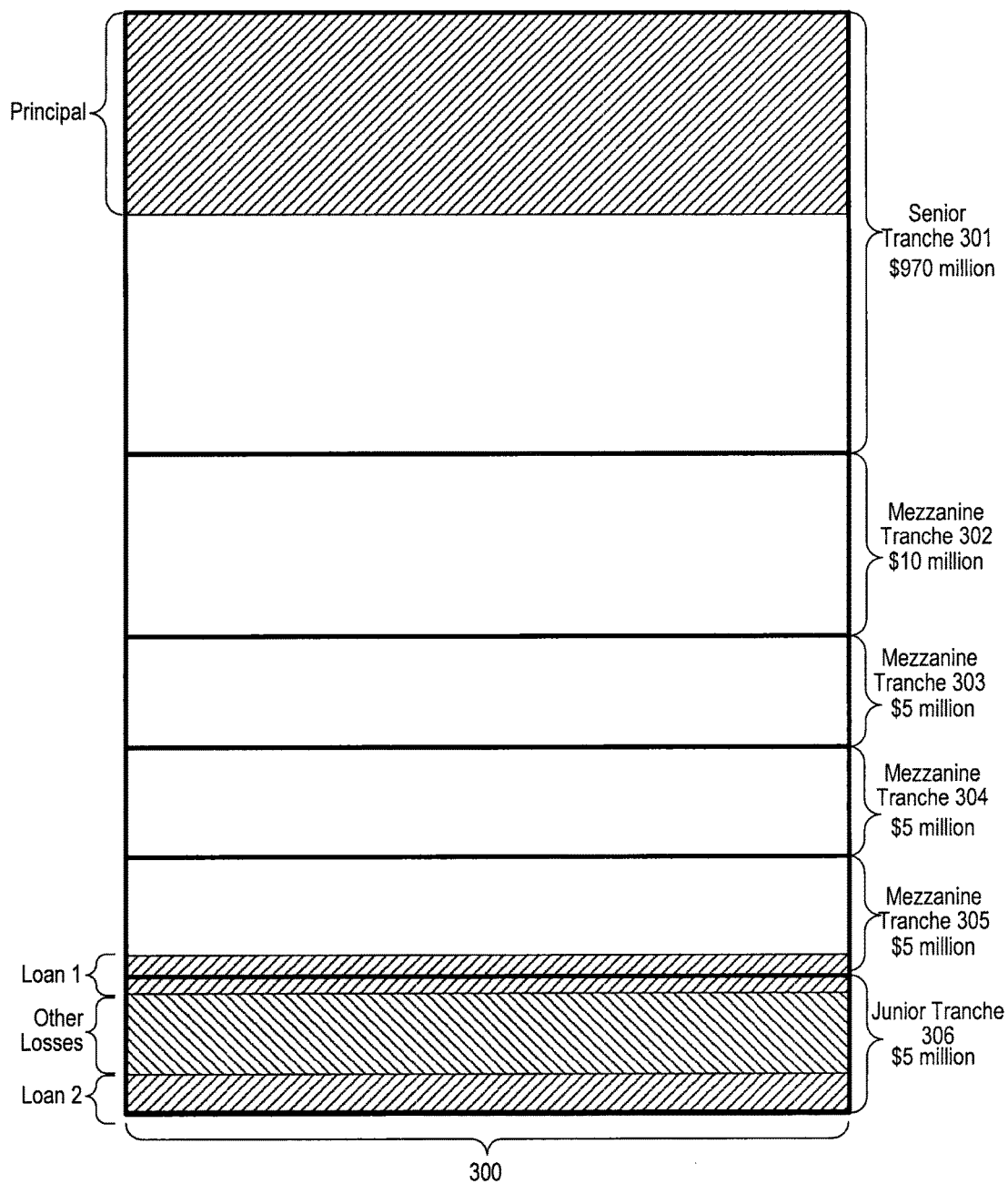
FIG. 3 illustrates an exemplary synthetic reference structure, consistent with certain aspects of the invention.

At step S203, method 200 stores a synthetic reference structure based on the secured loans from group 1. In one embodiment, a synthetic reference structure is stored data representing the outstanding balance on a group of underlying loans, with one or more "tranches" as discussed below. FIG. 3 illustrates an exemplary synthetic reference structure 300 representing group 1. Because the total outstanding balance for the loans in group 1 is one billion dollars, the total value represented by synthetic reference structure 300 is also one billion dollars, e.g. one billion dollars outstanding balance on the loans from group 1.

Synthetic reference structure 300 is subdivided into a number of "tranches." Each tranche may represent an obligation on some portion of the total one billion dollars of outstanding mortgage balances. For example, junior tranche 306 and mezzanine tranches 305, 304, and 303 may each represent five million dollars from the one billion. Mezzanine tranche 302 may represent 10 million dollars from the one billion, and senior tranche 301 may represent the remaining 970 million dollars.

In one embodiment, a protection seller, such as insurer 1, may sell protection to the lender on junior tranche 306. The lender may make regular monthly payments to insurer 1 for the protection, and insurer 1 may agree to compensate the lender when certain "credit events" occur that exceed a defined minimum value for triggering obligations related to junior tranche 306. In some embodiments, the minimum value for any tranche can be defined as the lower boundary of the tranche. In such an embodiment implemented as shown in FIG. 3, the minimum value for triggering an obligation in junior tranche 1 is zero dollars, whereas the minimum value for triggering an obligation in mezzanine tranche 305 is five million dollars. Note that in junior tranche 306, any "credit event" will cause a protection seller to incur an obligation until junior tranche 306 has accumulated five million dollars in total losses. "Credit events" are discussed in more detail below, but generally can be any contractual default or other event associated with a borrower, prior to a foreclosure sale.

As discussed, mezzanine tranche 305 has a minimum value of five million dollars for triggering an obligation. Consider an embodiment in which insurer 2 agrees to sell protection to the lender covering mezzanine tranche 305. Essentially, this means that five million dollars worth of losses have to be applied to synthetic reference structure 300 before a loss can trigger an obligation on the part of insurer 2. In this exemplary embodiment, insurer 1 is entirely responsible for junior tranche 306, and insurer 1 will have to pay the lender five million dollars before insurer 2 is obligated. The ceiling for each tranche represents the maximum exposure for an insurer on that tranche. Thus, insurer 2 will be entirely liable for the second five million dollars of losses, as mezzanine tranche 305 has a floor of five million dollars and a ceiling of 10 million dollars.

Referring again to FIG. 2, at step S204, method 200 may receive information indicating that a "credit event" has occurred for one of the loans in group 1. In one embodiment, a "credit event" may be any event associated with a borrower, but typically represents some contractual default by a borrower. For example, in one embodiment, a credit event may be defined to be any borrower becoming 120 days delinquent on their payments. In an implementation on system 100, if the borrower for loan 2 becomes 120 days delinquent, obligation engine 113 will receive information indicating that a credit event has occurred for loan 2. The information can be received from virtually any source, but in one embodiment will be sent by automatic payment monitoring software resident on lender terminal 110.

At step S205, method 200 calculates a loss due to the credit event. As discussed below, a number of methods can be used to calculate the loss. The lender is unlikely to lose the full outstanding balance in a secured transaction, and the methods discussed below are intended to approximate the actual loss the lender will incur.

To provide an example to clarify the explanation, assume that the loss is calculated to be 100% of the outstanding balance of loan 2, i.e. $200,000, due to a credit event associated with loan 2 (FIG. 4). Further, assume that loan 2 is the first loan to suffer a credit event among the loans in group 1 (FIG. 5).

In one embodiment, once the loss is calculated in step S205, obligation engine 113 updates table 500 to reflect the loss as shown in table 500-2. Table 500-2 now shows losses of $200,000, due to the credit event for loan 2. If additional credit events occur for the loans in group 2, table 500 will be updated accordingly. In FIG. 3, the loss for loan 2 may be represented in synthetic reference structure 300 as the shaded area at the bottom of junior tranche 306. Each time a loss occurs, this may be represented by "filling up" the tranches. When the loss occurs, the loan may be considered as having been removed from the pool of loans underlying synthetic reference structure 300, e.g. the loans in group 1.

At step S206, method 200 determines if an obligation is triggered for any of tranches 301-306. An obligation may be triggered in a given tranche if the value of the loss in aggregate with previous losses is sufficient to exceed a defined value for triggering the obligation for that tranche. For example, the value to trigger an obligation for junior tranche 306 is zero dollars, while the value to trigger an obligation for senior tranche 301 is 30 million dollars. Thus, a credit event for loan 2 will result in an obligation being triggered for junior tranche 306 if no previous losses occurred, or may result in an obligation being triggered for senior tranche 301 if 30 million dollars worth of previous losses have occurred in group 1. As discussed, the loss may be calculated to be the full value of the loan, i.e. $200,000. In one embodiment, lender terminal 110 may automatically send an electronic bill for the loss to insurer 1.

After step S206, in one embodiment, method 200 returns to step S204, and steps S204 through S206 are implemented for each new credit event. To continue our example, assume credit events occur over time in group 1 and insurer 1 of junior tranche 306 is obligated to pay $4,950,000, as shown in table 500-3. These losses can be represented in synthetic reference structure 300 by adding them to the losses to loan 2, as shown in the shaded area marked "other losses" in synthetic reference structure 300.

Assume that after these other losses are accumulated, a credit event occurs for loan 1. In this example, method 200 again returns to steps S204-S206. At step S204, method 200, for example via obligation engine 113, receives information indicating that the credit event has occurred for loan 1.

Method 200 then moves to step S205, and calculates a loss due to the credit event for loan 1, which updates the table for group 1 as shown in table 500-4. The loss due to loan 1 may be represented in synthetic reference structure 300 by the loan 1 area which straddles junior tranche 306 and mezzanine tranche 305. Again, for this example, assume the loss is equal to the total balance on loan 1, i.e. $100,000. In one embodiment, obligation engine 113 may calculate the loss and update table 500-3 to produce table 500-4, reflecting the new total aggregate losses of $5,050,000 for group 1.

At step S206, method 200 determines if an obligation is triggered for any of tranches 301-306. In this example, an obligation is again triggered for junior tranche 306. However, for an embodiment in which the maximum obligation of each tranche is determined by the ceiling of the tranche, the maximum obligation for junior tranche 306 is five million dollars. Method 200 will thus apply only $50,000 of the loss from loan 1 to junior tranche 306, and apply the remainder to mezzanine tranche 305. This may include sending an electronic bill to insurer 1 for the $50,000, in some embodiments. At this point in the example, junior tranche 306 is effectively no longer in existence, wiped out by the five million dollars in accumulated losses.

As noted, method 200 applies the losses that exceed the five million dollar ceiling of junior tranche 306 to the next tranche, which is mezzanine tranche 305. As set up for this example, insurer 2 is obligated to replace losses for mezzanine tranche 305. Therefore, method 200 will assign the remainder of the loan 1 loss to insurer 2. This may be implemented by obligation engine 113 sending an electronic bill for the remaining loss of $50,000 to insurer 2.

Publishing Data Over the Web

The performance of the loans from group 1 will be of interest to a number of different parties. In one embodiment, the lender can make the loan data from loan database 111 public by publishing the data over network 150 using lender terminal 110. Thus, various terminals on network 150 such as insurer 1 terminal 120 and insurer 2 terminal 130 can request data from loan database 111 to view the performance of the underlying loans over time using a web browser. Similarly, a web page including a visual diagram of synthetic reference structure 300, such as shown in FIG. 3, can be sent by lender terminal 110 to any other terminal connected to network 150 for display in a web browser.

Of course, publishing data about a number of individual loans over the internet may make it rather difficult for potential insurers to evaluate the risk posed by the group of loans as a whole. Thus, while it is the performance of the individual loans that determines the obligations incurred for any given credit event, from an insurer's perspective their risk is easier to evaluate by viewing a summary of the loans in the group. To this end, the lender may aggregate the data from the loans into "pool-level disclosures" describing the loans in a group underlying a particular synthetic reference structure, as discussed below.

Disclosure Variables—Loan and Pool-Level

FIG. 6 illustrates an exemplary pool-level disclosures table 600 for the groups of loans. In the implementation shown, pool-level disclosures table 600 includes aggregate data about the loans from group 1 taken from loan table 400, and can be used by insurers to estimate the likelihood of incurring obligations under contracts structured as represented by synthetic reference structure 300. In one embodiment, pool-level disclosures table 600 may be published by lender terminal 110 over network 150.

As discussed, loan table 400 includes a number of different attribute fields for each of the loans in loan database 111. Among the exemplary fields shown is a "Documentation Type—Assets Verified?" field. This field indicates whether the borrower(s) on the loan provided documentation or other proof of their other assets when they applied for the loan. In the example shown in FIG. 4, the borrower for loan 1 did provide such documentation, whereas the borrower for loan 2 did not. In the example shown in FIG. 6, pool-level disclosures table 600 includes an analogous field, but the value of 87% means that 87% of the loans in group 1 had their assets verified when the borrower applied for the loan.

Another field in loan table 400 is a "Documentation Type—Employment Verified?" field. This field indicates whether the borrower(s) on the loan provided documentation about their employment when they applied for the loan, or whether other proof was available, such as a call to the borrower's employer to verify employment. In FIG. 4, the borrower for loan 1 did provide such documentation, whereas the borrower for loan 2 did not. In the example shown in FIG. 6, pool-level disclosures table 600 includes an analogous field indicating that 92% of the loans in group 1 had the borrower's employment verified when the borrower applied for the loan.

Another field in loan table 400 is a "Documentation Type—Income Verified?" field. This field indicates whether the borrower(s) on the loan provided documentation about their income when they applied for the loan, such as a W-2. Other proof may have been used such as a call to the borrower's employer to verify their income. In FIG. 4, the borrower for loan 1 did provide such documentation, whereas the borrower for loan 2 did not. In the example shown in FIG. 6, pool-level disclosures table 600 includes an analogous field indicating that 58% of the loans in group 1 had the borrower's income verified when the borrower applied for the loan. Note that 34% (92%–58%) of the borrowers in group 1 had their employment verified but did not actually verify their income.

In some embodiments, the lender may not know whether assets, employment, or income were verified for certain loans. In this case, an "n/a" value can be stored for the loan in the appropriate field in loan table 400. In some embodiments, pool-level disclosures table 600 can include an additional number representing the percentage of loans in the groups for which the lender is uncertain whether assets, employment, or income were verified.

The next exemplary field in loan table 400 is the % CLTV, or combined loan-to-value percentage. This number represents the ratio of the outstanding balance on the loan divided by some estimate of the current value of the property. Any number of methods can be used to obtain an estimated current value for a property, such as using the Case-Schiller or other property value indices, an online appraisal, an in-home appraisal, a broker price opinion, or tax records. Combined LTV can also account for other encumbrances or liens on a property, such as a second mortgage.

In the example shown in FIG. 6, pool-level disclosures table 600 includes the average current combined loan to value for the loans in groups 1 and 2. In one embodiment, the average CLTV is calculated by first calculating a CLTV for each property, adding the CLTV percentages, and dividing them by the number of properties. This method will tend to weight each property in the group equally. In other embodiments, the average CLTV can be calculated by combining the outstanding balances for all of the properties and dividing that value by the sum of the current values. This method will tend to weight more expensive properties more heavily than less expensive properties. In other embodiments, statistics such as mean, median, and mode can be provided as well. Quartiles or other percentiles may also be provided as well.

Note that while only one CLTV value is shown in tables 400 and 600, this value can be calculated both at the time the loan is made (the "original" CLTV) and recalculated periodically to reflect changes in property value and the outstanding balance (the "current" CLTV). In some embodiments, both numbers are available in tables 400 and 600.

In one embodiment, the number of borrowers field in loan table 400 contains a value equal to a number of borrowers on a loan. In other embodiments, however, the value may be restricted to a 1 or a 2—the number 2 is used to represent any number of borrowers other than 1. In the example shown in FIG. 6, pool-level disclosures table 600 may provide the percentage of loans with more than one borrower, e.g. 20% for group 1, or alternately, an average number of borrowers.

In the example shown in FIG. 4, the loan purpose field in loan table 400 indicates the purpose of the loan. Three values are shown—P for purchase, C for cash-out refinance, and N for a non-cash-out refinance. Cash-out refinance means the borrower refinanced the property but took out some of the equity in the home. In one embodiment, pool-level disclosures table 600 can include 3 percentages separated by slashes in the format P/C/N. Thus, pool-level disclosures table 600 indicates that 50% of the borrowers from group 1 borrowed just to purchase a home, 25% borrowed for a cash-out refinance, and 25% borrowed for a non-cash-out refinance.

The initial interest only period field in loan table 400 may indicate an interest-only period for a loan. Some loans, particularly ARMs, have an interest-only period followed by an amortization period. The interest-only portion of the repayment term is indicated in this field. As shown in FIG. 6, the average interest only repayment term for the loans in group 2 is 5 years in pool-level disclosures table 600. Note that fixed-interest loans generally will not have an interest-only period, as indicated in pool-level disclosures table 600 by the "n/a" for group 1.

The first time home buyer field in loan table 400 indicates whether the borrower has previously purchased a home. As shown in loan table 400, the borrower for loan 1 has previously purchased a home, whereas the borrower for loan 2 has not. Exemplary pool-level disclosures table 600 indicates that 16% of the borrowers for group 1 have previously purchased a home, and 80% of the borrowers for group 2 have done so.

The % PMI (private mortgage insurance) field of loan table 400 indicates how much, if any, of the lender's exposure is already covered by mortgage insurance. Thus, loan 1 has no mortgage insurance—the lender will not receive any insurance proceeds in the event of a default. Loan 2, on the other hand, has 10% coverage—so, the mortgage payments to the lender are guaranteed up to 10% of the outstanding balance. The corresponding field in pool-level disclosures table 600 indicates the average % PMI on the loans in that pool. In some embodiments, revenue provided to the lender by mortgage insurance on a default can be used to offset the severity of the loss.

The debt-to-income (DTI) field in loan table 400 indicates the debt-to-income ratio of the borrower. This value may be calculated only for the mortgage debt, or may be calculated for all of the borrower's debt obligations, including, for example, recurring payments for student loans, credit cards, car payments, etc. The income may be verified income or simply income provided by the borrower. As shown in FIG. 6, the corresponding field in pool-level disclosures table 600 may be calculated by adding up all the percentages from a group and dividing by the total number of loans in the group, or by adding up all of the reported incomes and dividing them by the total monthly payments for the borrowers, or some other way. In other embodiments, statistics related to DTI such as mean, median, and mode may be provided as well. Quartiles or other percentiles may also be provided.

Note that while only one DTI value is shown for the example illustrated in tables 400 and 600, and although DTI is typically only calculated at loan inception and is not subsequently updated, this value may be calculated both at the time the loan is made (an "original" DTI) and recalculated periodically to reflect changes in the borrower's income and debts (a "current" DTI). In some embodiments, both numbers are available in tables 400 and 600. However, In some embodiments, a borrower's credit scores (e.g., FICO) may be reported in table 400 and averages of credit scores in pool-level disclosures table 600.

The next two fields in loan table 400, MSA (metropolitan statistical area) and CBSA (core based statistical area), are both indicators of the geographical location of the property securing a given loan. In one embodiment, these may be reported in the aggregate as a statistical distribution across MSA's or CBSA's. In the embodiment shown in FIG. 6, each loan in group 1 is from the same MSA, 4845, so the MSA number itself is reported.

Third party origination ("TPO") field in loan table 400 indicates whether the lender is the party that originally made the loan. In the example shown, loan table 400 indicates that loan 1 was originally made by the lender, but loan 2 was transferred to the lender by the original lender. This information may be reported in the aggregate in pool-level disclosures table 600 by providing the percentage of third party originations for the group, e.g. 16% for group 1 and 70% for group 2. Current TPO may be used to reflect error correction in the underlying loan data, e.g. loans that were originally misclassified.

Other exemplary fields in tables 400 and 600 are self-explanatory for those of ordinary skill in the art, for example the individual loan balances (loan table 400) and average loan balances for the group (pool-level disclosures table 600). These values may represent original or currently outstanding loan balances. The coupon % field in loan table 400 represents the interest rate on the underlying loan, and the coupon % in pool-level disclosures table 600 may be the average coupon % by adding the percentages of the underlying loans and dividing by the number of loans in the group. In another embodiment, the average coupon % may be weighted by the amount of each loan.

The state field in loan table 400 represents the state in which the collateral property is located. For the exemplary pool-level disclosures table 600 shown in FIG. 6, the state field indicates all of the loans from group 1 are in Texas, and all the loans from group 2 are in Nevada. In some embodiments, loans in a group may be from more than one state, and pool-level disclosures table 600 can contain breakout percentages for the states of the underlying loans, e.g., group 3 might be 78% Texas, 22% Nevada. Zip codes, MSA's, CBSA's, or other indicators of location can also be used in this field rather than the state.

The type field in loan table 400 indicates whether the loan is an adjustable-rate loan (ARM) or a fixed-rate loan. In the disclosed embodiments, ARM loans and fixed-rate loans are in different groups. However, in some embodiments ARMS and fixed rate loans may be grouped together to form a single reference structure, and the percentages or other statistical indicators of the relative number of ARMs and fixed-rate loans may be reported in pool-level disclosures table 600.

The remaining months to maturity field in loan table 400 represents the number of months until maturity on the underlying loan, and the corresponding field in pool-level disclosures table 600 may represent an average number of months for the loans in the group. In some embodiments, the number of months to maturity is weighted by the outstanding or original balance of the loan. Similarly, original loan to value field in loan table 400 indicates the LTV ratio when the loan was made. The corresponding field in pool-level disclosures table 600 may be calculated by adding the LTV's for each loan in the group and dividing by the number of loans, or using an average weighted by the original or outstanding balance on the loan.

The index field in loan table 400 generally only relates to ARM loans. ARM loans have floating interest rates tied to some index, such as LIBOR (London inter-bank offered rate). In some embodiments, more than one index is used in an underlying group of ARM loans, and pool-level disclosures table 600 may contain the percentage of LIBOR-referenced loans along with percentages for other indices. The fixed term field in loan table 400 represents how long the original interest rate on an ARM is maintained before being tied to the index. The corresponding fixed term field in pool-level disclosures table 600 may be the average fixed term for the group, or weighted by original or current balance for each loan in the group.

The cap % field in table 400 indicates the maximum interest rate for the ARM, whereas the floor field indicates the minimum value. These values may be reported as averages or weighted (by original or current balance) averages in pool-level disclosures table 600. Reset term field in loan table 400 indicates the duration that each change in interest rate on the ARM lasts for in years, and the max change field in loan table 400 indicates the maximum allowable change in each term. These values may also be reported as averages or weighted averages in pool-level disclosures table 600.

Tables 400 and 600 may be requested by the various terminals in the embodiment shown in FIG. 1, for example, by sending an electronic data request over network 150 to lender terminal 110. Lender terminal 110 may respond by sending all or part of tables 400 and/or 600 to the requesting terminal. In this manner, interested parties can electronically obtain information about the loans underlying a synthetic reference structure.

Note that in some embodiments, not all of the disclosures in loan table 400 or pool-level disclosures table 600 will be available. Lenders may decide for various reasons not to make available certain loan data. For example, if a lender determines that % PMI has very little impact on the likelihood of a loan defaulting, the lender may choose not to disclose this variable. Similarly, if the lender determines that disclosing the interest-only period for individual ARM loans will not impact the credit rating of tranches in a synthetic reference obligation or otherwise impact the protection they can obtain from an insurer, the lender may decide not to disclose this variable.

Various Credit Events can be Used to Trigger an Obligation

As discussed above, a "credit event" can be used to trigger an obligation under a synthetic reference structure. A credit event may be defined between two parties, for example a lender and an insurer, as virtually any event associated with a borrower or a loan, but will often be a pre-foreclosure contractual default. For example, a credit event can be defined as any number of days of delinquency by a borrower, e.g. 90, 120, 360, etc. As another example, a credit event can be defined as a borrower selling a property where a note is due in full on transfer of the underlying property, but the lender is not paid in full when the borrower sells the property.

It is important to remember that the credit event triggering the obligation may often be different from the actual foreclosure. In some circumstances, there may never be a foreclosure by the lender, yet an obligation will be incurred under synthetic reference structure 300. In one embodiment, the lender and the insurer negotiate the specific credit events that will trigger an obligation under synthetic reference structure 300. In other embodiments, the insurer negotiates with, and is insuring a party other than, the lender. Any pre-foreclosure action by a borrower could be defined as a credit event. In some embodiments, the credit event need not even be a contractual default—the credit event could be a borrower filing for bankruptcy, requesting a loan modification while continuing to make their payments, or some other event.

Scaling Obligations Based on a Synthetic Reference Structure

In the example presented above, it was assumed that the lender was paying insurers 1 and 2 to mitigate the risk on only the loans in group 1. However, synthetic reference structure 300 is not so limited, and can allow the lender to mitigate risk over a much larger group of loans. For example, assume group 1 consists of 1000 30-year fixed rate loans in the state of Texas. Now assume the lender actually has 100,000 30-year fixed rate loans in Texas, e.g. 100 times more loans in Texas than are actually in group 1. The lender can use another embodiment based on synthetic reference structure 300 to approximately mitigate their risk for all of the loans in Texas if they choose.

To do so, the lender can simply negotiate obligations with insurers that are 100 times the losses in group 1. Thus, in such an embodiment, the lender can scale the electronic bill sent to the insurers of each tranche based on the amount of exposure they have in a geographic area. This embodiment allows a relatively small subset of loans to serve as a proxy for the lender's risk in the entire geographic area. The costs of doing so are significantly less than the costs would be to calculate losses for all 100,000 30-year fixed rate loan in Texas.

In this case, the total size of synthetic reference structure 300 would be approximately 100 times less than the lender's actual exposure to losses from 30 year fixed-rate loans in Texas. If the lender wishes to obtain full protection, they simply negotiate a scaling factor of 100 for the losses incurred for synthetic reference structure 300. For example, the first loss discussed in the example above, the loss for loan 2, would result not in an obligation of $200,000, but rather in an obligation of $20,000,000, for insurer 1. More generally, for this embodiment the actual obligation billed to the insurer on any loss can be calculated here as (calculated loss*negotiated scaling factor). Methods for calculating a loss when a credit event occurs are discussed below in more detail.

By scaling the obligations calculated using a relatively small group of loans (such as group 1), the lender can use a relatively small sample of loans, e.g. group 1 having a common attribute, such as a common geographic area, to represent an entire population of loans with that same attribute, such as loans from the same area. If the sample is truly representative of the underlying loan population, the lender can expect that the obligations invoked under synthetic reference structure 300 will be approximately proportional to the losses from all the loans with the same attribute, such as in the geographic area in question.

In some embodiments, the lender does not negotiate full protection. For example, the lender could decide that they only want to be protected against up to 50% of their potential loss exposure for 100,000 30-year fixed loans in Texas. In this case, the lender could negotiate a factor of 50 with the insurers for obligations incurred under the 1,000 loan synthetic reference structure 300. In other embodiments, the lender may negotiate any factor they desire, depending upon how much risk they wish to mitigate.

Further, virtually any loan characteristic(s) or attribute(s), and not just geography, can be used as the basis for grouping loans in a synthetic reference structure. For example, any of the attribute fields in loan table 400 can serve as a basis for grouping loans. Assume, for example, that the lender decides that they would like to mitigate their risk for loans with debt to income ratios (DTI) over 30%. In this case, the lender could form a group including loans such as loan 2, with a DTI of 48%, and loan 3, with a DTI of 32%, along with any number of other such loans. The lender could also consider additional attributes for grouping, such as only their 30-year fixed loans, only their loans in a given geographic area, etc. In some embodiments, a lender may choose to take out protection on some, but not all, tranches in a synthetic reference structure.

Guaranteed PC's

In the mortgage industry, it is common for lenders to sell interests in the notes underlying their mortgages. The securities that represent these interests are known as "pass-through certificates" or "PC's" and they allow ownership of a pool of underlying loans ('the PC pool') by the investors in the PC's. In many cases, foreclosure losses fall directly on the PC investors, and the lender is not obligated to reimburse the investors.

However, certain PC's are "guaranteed" by the lender. For some guaranteed PC's, the lender guarantees the principal underlying the loans, and is obligated up to make whole any foreclosure deficiency. To mitigate their potential for losses under these guaranteed PC's, the lender could simply sign contracts for credit derivative swaps on each of the underlying properties in the PC pool. However, there may be a large number of PC's serviced by a given lender, and a large number of loans in each PC pool. Thus, the cost of executing a CDS on each loan for one or more PC's may be quite large. Further, as discussed, standard CDS obligations require waiting until foreclosure to do a cash or physical settlement.

According to one embodiment consistent with the invention, by using a synthetic reference structure, the lender could insulate itself from losses in a large PC pool. In such an embodiment, the group of loans underlying the synthetic reference structure may be chosen to closely emulate the characteristics of loans in a much larger PC pool. By insuring, with appropriate scaling factors, the loans in the emulative synthetic reference structure, the lender may mitigate their risks on the PC without having to execute a CDS on every loan in the PC. Instead, the lender would only have to negotiate a contract incurring obligations based on the emulative synthetic reference structure, and scale those obligations to the size of the PC.

Other embodiments use further levels of abstraction. There is no requirement that the loans underlying a synthetic reference structure are all from the same PC pool. Thus, a lender guaranteeing, for example, 10 PC pools, each representing a group of loans in a different state, may form a synthetic reference structure with randomly selected loans from each PC pool, e.g. loans from 10 states. With appropriate insurance contracts, the lender could mitigate the risk on all 10 PC pools using only one synthetic reference structure.

In other embodiments, one PC pool may be emulated by multiple synthetic reference structures. For example, suppose one guaranteed PC pool consisted of loans from 10 states. The guarantor may then form ten separate synthetic reference structures for each state, and use them to mitigate risk for the entire PC pool. This could be useful if certain states in the PC pool are more likely to suffer credit events than other states in the PC pool, because the guarantor could negotiate higher scaling factors in those states with higher risk.

If it is publicly known that a lender is aggressively hedging risk on one particular PC pool, this could adversely affect the value for owners of the PC pool. Further, if loans taken from only one PC pool are used in a synthetic reference structure, a great deal of information about the PC pool could be derived from the synthetic reference structure disclosures—e.g. loan-level attributes published in loan table 400, and the pool-level attributes published in pool-level disclosures table 600. By using multiple synthetic reference structures per PC pool, and/or multiple PC pools per synthetic reference structure, the synthetic reference structure becomes less representative of the loans in a particular PC pool because the PC pool and the group of loans underlying the synthetic reference structure have fewer common loans. Thus, the publicized synthetic reference structure data yields less insight into the PC pools.

The lender, however, knows which synthetic reference structures are being used to hedge risk against which PC pools. Thus, the lender can effectively publish a relatively small subset of data, e.g. tables 400 and 600, while mitigating risk for a much larger group of loans. However, the owners of the PC pools will not be adversely affected by the disclosure, because the PC pools will only have a relatively small number of loans in a number of different synthetic reference structures.

In some embodiments, obligation engine 113 receives user input identifying a PC pool, and chooses which loans from the PC pool to assign to a group underlying a synthetic reference structure. For example, obligation engine 113 may randomly select a percentage of loans from the identified PC pool and automatically create a synthetic reference structure based on the randomly selected loans.

In some embodiments, user inputs identify several PC pools, and obligation engine 113 selects loans from the identified PC pools to create a single group of loans representing the identified PC pools. Obligation engine 113 may then automatically create a synthetic reference structure based on the single group to represent the identified PC pools. In some embodiments, obligation engine 113 selects the loans so that the relative sizes of the identified PC pools are accounted for by the relative balances of the loans in the group with respect to the PC pools' balances.

In some embodiments, user inputs identify one or more PC pools, and obligation engine 113 selects loans from the identified PC pools. The selected loans may be divided into subgroups which are each used to create a synthetic reference structure. In some embodiments, each subgroup will comprise loans sharing a common characteristic based on the data in table 400, such as a common range of outstanding balances or a common geographical location.

Determining Premiums

In the example discussed above, it was assumed that the maximum obligation incurred by insurer 1 and insurer 2 was the total value of losses in their respective tranches. The insurer's obligations with respect to synthetic reference structure 300 allowed the lender to reduce their exposure to negative loan events, such as defaults, in the loans from group 1. In exchange for helping the lender mitigate this risk, insurer 1 and insurer 2 received regular payments, or premiums, in compensation.

As part of the structure of the arrangement, insurer 1 agreed to be obligated on junior tranche 306, possibly multiplied by some negotiated scaling factor, and agreed to be obligated for the first five million dollars in defaults from group 1. In exchange, insurer 1 received premiums from the lender that insurer 1 believed would have a value greater than the amount insurer 1 would pay out to the lender due to credit events associated with group 1 loans. Insurer 2 also received a premium, but these premiums were lower because insurer 2 would not have to pay for losses in mezzanine tranche 305 until five million dollars in losses had accumulated in junior tranche 306.

By the same token, if a lender wishes to negotiate contractual obligations on the part of insurer 1 and insurer 2 that are scaled off of a synthetic reference structure, insurers 1 and 2 will naturally negotiate higher premiums to compensate for any likelihood or amount of increased potential obligations. There is no requirement that one insurer be the only insurer who incurs obligations on a given tranche. Both insurer 1 and insurer 2 could have obligations on junior tranche 306 and mezzanine tranche 305, for example. The lender is free to make any number of contracts with any number of insurers, using a synthetic reference structure 300.

Loss Calculations

In the example discussed above, it was assumed that the loss calculated due to a "credit event" was the full outstanding balance on the loan suffering the credit event. This may not closely approximate the actual loss, as the lender may foreclose on the property and force a sale, and the borrower's obligations to the lender will be at least partially satisfied by the proceeds from the foreclosure sale. Thus, using the full outstanding balance is not usually the most accurate way to reflect the lender's actual losses. On the other hand, as discussed in the background section, waiting until the actual foreclosure sale to determine the losses is undesirably time-consuming. Further, if the lender has adequate coverage from a standard CDS obligation on the property, the lender may not endeavor to minimize their losses in the foreclosure because any losses will be satisfied by the CDS obligation.

The amount of the outstanding balance that is incurred as an obligation by an insurer under synthetic reference structure 300 can be considered the "severity" of the loss. An obligation of the full outstanding balance, e.g., $200,000 for loan 2, can be considered a "100% severity" loss. Actual losses for the lender will generally be less than 100%, as the lender will receive proceeds from the foreclosure. To more closely approximate the actual loss to the lender, the severity of a loss calculated under synthetic reference structure 300 may be less than 100% of the outstanding balance.

When negotiating a contract with an insurer, the lender and insurer can decide how they wish to account for the severity of each loss. In some embodiments, a fixed severity percentage, such as the aforementioned 100%, is one way to factor in the severity of the loss, and thus adjust the size of the corresponding obligation. For another fixed percentage example, if the lender knows that, on average, they will not recover 35% of the outstanding balance on the loans from group 1, they may negotiate a severity of 35% with insurer 1 and insurer 2. In such a case, the obligation for a credit event would be 35% of the outstanding balance of the associated loan, regardless of the actual loss suffered by the lender.

In some embodiments, another way to calculate the severity of losses is to defer the severity determination until the credit event actually occurs. When a credit event occurs, a formula can be applied to calculate the severity. One exemplary formula is equation 1:

$$\text{Severity} = \text{Collateral Deficiency} + \text{Lost Interest} + \text{Variable Costs} + \text{Fixed Costs}$$

The collateral deficiency term can be determined by subtracting an estimated value of the property from the unpaid balance (UPB) on the loan, e.g. as shown in equation 2:

$$\text{Collateral Deficiency} = \text{UPB} - \text{estimated value} * \text{foreclosure discount}.$$

An estimated value of the property can be determined in several different ways. One way is to use an initial purchase price of the property or an appraisal, and modify that value by comparison with a standardized index. For example, the Case-Schiller indices include a U.S. National Home Price index along with subindexes for 20 different metropolitan areas. Further indices can be obtained at the zip code level and other metropolitan areas. To estimate the value of the property, the initial purchase price or appraisal value can be modified by the corresponding change in the Case-Schiller index for the U.S. as a whole, or a local index, over the period of time since the last valuation, such as by purchase or appraisal.

As a numerical example, consider loan 2. Assume loan 2 was for a house appraised at $222,000 at the time it was purchased. Now, assume that the Case-Schiller index in the metro area where the house is located indicates that property values have declined 50% in that area. The estimated value of the property in equation 2 would be $222,000−50%*$222,000=approximately $111,000.

Another way to determine an estimated value of the property is to obtain a Broker Price Opinion, or BPO. A BPO is similar to a property appraisal, but usually less extensive. A BPO is usually done by a real estate broker or agent rather than a licensed appraiser. The BPO can be ordered from an independent source, so that the lender and the insurer are both confident that the BPO value for the property was not manipulated by the other party.

The BPO or Case-Schiller method will give an estimate of the value of the property as it stands, if the property were to be sold on the open market. However, foreclosure sales tend to recoup less of the value of the property than a sale by a homeowner. Therefore, a foreclosure discount may be applied to the estimated value, perhaps 15%, for an estimated property value of 85% of the value determined by BPO or Case-Schiller. The foreclosure discount may vary by state or other geographical division, depending on how much less foreclosed properties tend to recoup relative to similar properties sold by homeowners.

Once equation 2 has been applied, there is some estimate of the collateral deficiency. The next term in the severity equation is lost interest. Lost interest can be calculated using equation 3:

$$\text{Lost interest} = (\text{Coupon}) * (\text{months until foreclosure}/12) * \text{UPB}.$$

The lost interest term comes into play because the lender is not just losing out on the losses due to the foreclosure sale. The lender contractually should be collecting interest from the borrower during the time between the credit event and the foreclosure sale, but the likelihood is that the borrower is not actually paying on the loan. Depending on how long it takes the lender to foreclose on the property, the lender will suffer losses equal to the interest that the borrower was obligated to pay. One way to calculate this is to take the "coupon" or percentage interest on the underlying loan, and multiply it by the outstanding balance and the number of months between the credit event and the foreclosure. In some embodiments, the percentage used is an average percentage for the group of loans (e.g. group 1), rather than the actual percentage for the loan suffering the credit event.

Of course, the duration between the credit event and the foreclosure is not actually known at the time of the credit event. In order to accurately calculate a loss and therefore an obligation, an estimated months until foreclosure can be used instead. This allows obligations due to the lender to be incurred before the lender actually forecloses on the property.

Note that in some situations the foreclosure sale may take place long after the judicial foreclosure proceeding. For example, in a weak housing market, it may take months or even years after the judicial proceeding for a lender to actually sell a property and determine their loss on the loan.

An exemplary formula for estimating the time until foreclosure is shown here as equation 4:

months until foreclosure=12 if non-judicial or 24 if judicial

This formula accounts for differences between different jurisdictions. In some jurisdictions, no judicial proceeding is needed for the lender to foreclose on a property. In these circumstances, the time to foreclose will generally be less than the time to foreclose in those jurisdictions where a judicial foreclosure proceeding is required. In equation 4, 12 months is used as the estimate for jurisdictions where no proceeding is required, and 24 months if a proceeding is required. In other embodiments, other ways may be used to estimate the number of months between the credit event and the foreclosure. For example, average periods of time for a particular geographic area or jurisdiction may be used to approximate this period of time.

Unpaid balances and lost interest are not the only costs that may be incurred by the lender after a credit event. Costs such as utilities, property taxes, property upkeep, mechanic's liens, variable legal fees and real estate agent commissions will also be paid by the lender. These costs are represented by the variable costs term of equation 1, and can be defined by equation 5 as follows:

Variable costs=10%*(BPO*85%)

An embodiment using equation 5 assumes that the variable costs for a particular property will be roughly proportional to the value of the property. For example, property taxes are typically tied to an estimated value of a property. Other items, such as real estate commissions, can be a percentage applied to the sales price of the property. Thus, the foreclosure discount of 15% can also be applied to the variable costs by using only 85% of the BPO value.

Certain costs for the lender will also be independent of the property value. These costs are represented by the fixed costs term of equation 1. In some embodiments, this term may be predefined by a set dollar value, for example $15,000 for each credit event. This term can represent costs such as those for obtaining the broker price opinion, title and recording fees, legal fees, etc.

Taking all of the terms together, the loss calculation for loan 2 could be calculated as in the following example. First, equation 1 is repeated for convenience:

Severity=Collateral Deficiency+Lost Interest+Variable Costs+Fixed Costs

As per our example, the unpaid balance on loan 2 is $200,000. Assume a broker price opinion is used rather than an indexing method or other approximation, and the BPO comes back as an estimated value of $100,000 for the property. Taking into account a foreclosure discount of 15%, the collateral deficiency term would be $200,000−$100,000*0.85=$115,000. Assuming lost interest, variable costs, and fixed costs were $5 k each for a total of $15 k, the calculated loss in this instance is $115 k+$15 k=$130 k.

As discussed in previous examples, this would be the loss incurred under the synthetic reference structure, and in our previous example, loan 2's losses were billed directly to insurer 1. However, in another previous example where the lender negotiated a scaling factor of 100 with insurer 1, the bill for insurer 1 would be 100 times the loss calculated under formula 1, i.e. $13,000,000.

In one embodiment, the calculations discussed above are performed by obligation engine 113. In some embodiments, obligation engine 113 will also multiply any negotiated scaling factors by the calculated severity and automatically bill the responsible insurer.

Negotiating Terms in Equation 1

As discussed in examples above, equation 1 can be used to estimate a lender's losses associated with a credit event from a loan in group 1, and synthetic reference structure 300 can be used to determine if a corresponding obligation is invoked for an insurer. Further, as discussed above, the lender can take out more protection than would be represented by the losses from group 1, by negotiating a scaling factor with an insurer and multiplying the losses from group 1 by the scaling factor.

Several of the terms used to determine the severity of a loss can also be negotiated. For example, the lender may wish to negotiate with an insurer about whether to use the Case-Schiller index or actually obtain a BPO to determine the estimated collateral deficiency. If a BPO is used, this might be reflected as an increased obligation on the part of the insurer, such as by including the cost of the BPO in the fixed costs term.

The foreclosure discount can also be negotiated as a fixed percentage of the BPO or index-based estimate of the property value. Of course the lender will prefer a larger foreclosure discount and the insurer will prefer a smaller discount. Another approach is to agree on a standard method for deferring the determination of the foreclosure discount to a later date. For example, data could be collected for the year preceding the foreclosure for the area where the property is located. The foreclosure discount could be based on foreclosure sale prices for other homes in the area relative to some estimate of their market value, such as recent appraisals or tax valuations.

Similarly, the number of months for lost interest, e.g. equation 4, can be negotiated to apply any reasonable method for estimating the time between the credit event and the lender's reimbursement by foreclosure. For example, a simple approach would be to use a constant term, such as 12 months, regardless of the type of foreclosure proceeding. A more sophisticated approach would be to defer the determination of this time until the occurrence of the credit event. At that time, the average backlog for foreclosures where the property is located could be used to calculate the number of months lost interest.

The variable costs term meant to cover utilities, property taxes, property upkeep, mechanic's liens, legal fees, broker fees, hazard insurance, and transaction taxes/stamps can likewise be specified in advance by using a fixed term. Alternately, the lender and insurer may choose to defer this determination and agree on any suitable methodology for determining the variable costs at the time of the credit event. For example, actual property tax data for the year of the credit event and actual utility rates for the year of the credit event can be used to calculate the variable costs, rather than using data available when the obligation is negotiated. Thus, the lender can insulate themselves from unforeseeable increases in utilities and property taxes in advance. Similarly, actual broker commissions and transaction tax/stamp costs for the year of the credit event can be used rather than determining these costs beforehand.

Likewise, fixed costs can be "fixed" at the outset by estimating suitable costs for legal fees, obtaining a BPO, or recording fees and taxes. Alternately, these fees can be determined at the time of the credit event by reference to some mutually agreeable methodology for determining the fixed costs.

In one embodiment, obligation engine 113 may present a user interface that allows a user to enter contract data into synthetic reference database 112. For example, a user may enter the various negotiated terms from equation 1, such as fixed costs, lost interest term in months or years, foreclosure discount, scaling factor, etc. This will enable obligation engine 113 to calculate a loss based on a credit event for a given loan and automatically determine a corresponding contractual obligation by applying the scaling factor, if any.

Naturally, by deferring the determination of the various terms that are reflected in equation 1, the insurer will incur potentially more obligations. In return for accepting this uncertainty, the insurer will likely demand a higher premium. It is expected that insurers will use their own mathematical models to evaluate the potential risks presented by this uncertainty and negotiate their premiums accordingly.

Of course, in simpler embodiments it is possible to eliminate many of the terms from the equation and simply used a fixed severity or just the BPO or index-based estimate to determine the estimated loss. Obligation engine 113 may also receive user inputs specifying a fixed severity for calculating obligations.

Why is the Reference Structure "Synthetic?"

The term 'synthetic' is generally applied to fixed-income type investments which have both characteristics of fixed income instruments and those of derivative securities. A true fixed-income instrument, backed by these mortgage loans, already exists, in the form of PCs, for example those issued by an agency such as Freddie Mac or Fannie Mae. Therefore, any link between those pledged loans (which could be in multiple PCs as previously mentioned) and a synthetic reference structure constitutes a 'derivative' relationship.

In some embodiments, the reference structure is used only for credit default swaps. In such embodiments, no party receives the actual principal or interest payments which are calculated on the synthetic obligation, and only the losses on the synthetic obligation result in potential cash flows from the protection sellers to protection buyers. However, it is also possible to create a synthetic reference structure, have no derivative trades against it, and have no one exchange any cash flows based on it. The reference structure may be characterized as 'synthetic' security due to all of these characteristics.

As discussed above in the background section, a typical credit default swap transaction is settled one of two ways—a physical settlement where the insurer takes ownership of the physical property, or a cash settlement after the foreclosure. In the case of a cash settlement after foreclosure, the insurer is obligated to pay the monetary losses incurred by the lender due to the foreclosure, but does not actually take possession of the property.

Once a borrower has defaulted and the conditions for foreclosure are fulfilled, the lender does not necessarily need to foreclose on the property. The lender can choose to renegotiate the loan, provide some temporary payment relief, or make other arrangements short of foreclosing on the loan. However, if the lender has a traditional CDS contract on a particular property, the lender's incentive to take measures short of foreclosure is reduced, because only by foreclosing on the property can the lender obtain the proceeds from the CDS.

By defining credit events that trigger a loss formula, it is possible to decouple the foreclosure from the CDS obligation. For example, in the case of synthetic reference structure 300, the obligations are contractually based on the loss formula of equation 1, rather than the actual settlement at foreclosure. This allows a lender to accelerate their insurance obligations to a date far in advance of the actual foreclosure. Moreover, because the obligations are independent of the foreclosure sale, the lender still has every incentive to take care of the property while minimizing costs. Indeed, the lender can even decide not to foreclose—the lender could simply renegotiate the debt with the borrower so that the borrower could continue paying on the loan, while still being reimbursed according to the synthetic reference structure.

In contrast, cash settlement of the obligation after foreclosure, e.g. a traditional CDS, would mean deferring the calculation of the obligation until after the foreclosure. Thus, the price paid in a cash settlement after foreclosure would be based the difference between the par value, e.g. the outstanding balance, and the market value for the foreclosed property. A physical settlement would mean actually transferring property ownership to the insurer. Rather than requiring a lender to go through with a foreclosure to trigger a traditional CDS, synthetic reference structure 300 can be used to mitigate risks on the underlying loans, while the lender continues to own the underlying loans. For this reason, the insurer's actual obligation is a derivative one, created based on the "synthetic" reference structure, rather than a real cash or physical obligation.

Thus, synthetic reference structure 300 can be independent of the actual disposal of the underlying properties, the lender has far more flexibility in handling the underlying loan. As discussed, the lender can choose to foreclose, or may alternately choose to renegotiate the obligation. Further, as discussed above, synthetic reference structure 300 can be used as a representative population of a larger group of loans, e.g. a PC pool. Thus, by choosing a representative subset of the larger group, the lender can insulate themselves from losses in the larger group by negotiating insurance obligations that are scaled off of the losses from synthetic reference structure 300.

Note that because the obligation is triggered by the predefined credit event rather than the loan being foreclosed upon and pulled from a PC pool, the lender does not have control over whether a CDS obligation is triggered on the synthetic reference structure. In contrast, in a traditional CDS, the lender can control whether a loan is foreclosed and pulled from a PC pool. Thus, in the case of a traditional CDS, the lender might foreclose on a loan in order to trigger obligations even when there is a substantial likelihood that the loan could be successfully renegotiated and the borrower could continue to make payments and stay in their home.

In contrast, by using the synthetic reference structure, it is possible for a lender both to be reimbursed on a CDS contract in order to cover their losses on a PC, and still renegotiate the underlying loan. This is because the CDS obligation is based on the credit event and loss formula instead of the ultimate disposal of the underlying loan. In the case of an agency such as Freddie Mac or Fannie Mae, this decoupling of the CDS obligation from the disposal of the loan allows the agency to meet two of their primary objectives—guaranteeing their PC obligations while allowing homeowners to keep their homes.

Severity for Junior Lienholder or PMI

In the discussion above, it was assumed that the lender would be able to foreclose on a property and recoup at least some of their losses. This is almost certainly true for a lender who is the senior lienholder on a given property. However, a party that is a junior lienholder may need more protection. Junior lienholders have rights to the proceeds of a foreclosure sale, but generally are only paid once the entire outstanding balance is paid to senior lienholders. Thus, a junior lienholder will generally wish to negotiate a higher severity, such as a fixed severity of 100% of the outstanding balance due to the junior lienholder.

Mortgage insurance companies may also wish to use synthetic reference structure 300. Depending upon an agreed upon coverage level, a mortgage insurance company will typically be obligated on some percentage of liabilities of the outstanding balance on a loan. Thus, a mortgage insurance company that wants to mitigate risk may do so by negotiating contracts using synthetic reference structure 300.

Prepayments and Principal Payments

At the time synthetic reference structure 300 is created, there is a current outstanding balance on the underlying loans. Over time, various events will make this current outstanding balance go down. For example, if the borrower for loan 1 makes a prepayment of $1,000, the outstanding balance on the loans would go down $1,000. This can be visualized in shaded area 310 of senior tranche 301. Shaded area 310 represents paid-off principal on the loans. Other events which can result in paying down principal include payment of the principal portion of a regular mortgage payment or a refinancing that pays off the loan balance in full.

Conceptually, these payments are applied to the top of synthetic reference structure 300. Thus, even though the total balance on the loans from group 1 goes down over time, lender 1 and lender 2 will still each have the possibility of up to five million dollars in obligations from junior tranche 306 and mezzanine tranche 305, respectively. Only when the total balance decreases below 990 million dollars will principal payments be applied to mezzanine tranche 305, and only when the total balance decreases below 995 million dollars will obligations under junior tranche 306 begin to decrease. Note that from the perspective of an insurer who is obligated on senior tranche 301, every prepayment or principal payment applied under synthetic reference structure 300 reduces their maximum exposure until 970 million dollars is applied.

ARM Synthetic Reference Structure and Alternative Application of Principal

Figure 7:
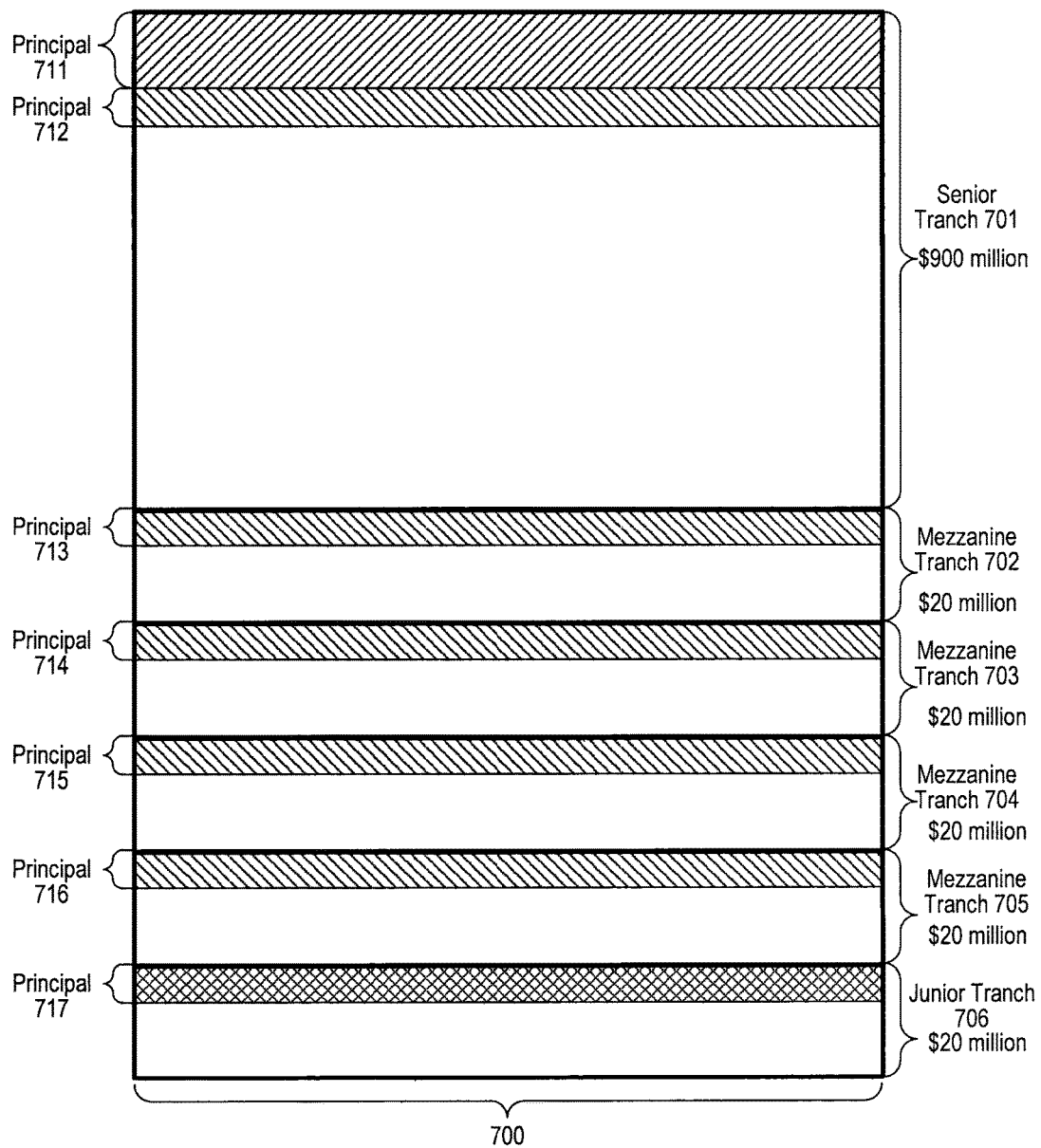
FIG. 7 illustrates an exemplary synthetic reference structure, consistent with certain aspects of the invention.

As shown in the exemplary embodiment of FIG. 7, obligation engine 113 may be used to create and store a synthetic reference structure 700 for the loans in group 2. The exemplary structure shown is similar to synthetic reference structure 300, but may include different sized tranches. Because the loans in group 2 are ARM loans, they may be viewed by insurers as having more risk than the fixed-rate loans in group 1. Several strategies may be used to mitigate this risk, including modifications to how payments are applied to synthetic reference structure 700. These strategies may also be used for fixed-rate loans.

In the fixed-rate example discussed with respect to FIG. 3, all payments reducing the principal on a loan were applied to senior tranche 301. In other embodiments, the total exposure to insurers for the lower-level tranches may be reduced by spreading these principal payments across all of the tranches. This strategy is illustrated as a shaded region of each of tranches 701-706 in FIG. 7, e.g. principal regions 712-717. These payments can be applied equally to each tranche, proportionally to the size of the tranche, or in some other fashion.

Consider an example shown in FIGS. 4 and 6, where loan 3 from group 2 has a total outstanding balance of $300,000. If this borrower pays off their loan in full, the $300,000 could be distributed as principal to the six tranches shown in FIG. 7—e.g., in an equal distribution embodiment, owners of tranches 701-706 may each have their total potential liability under synthetic reference structure 700 reduced by $50,000, i.e., principal regions 712-717 would each represent $50,000. In a weighted distribution embodiment, payment distribution may be weighted to the tranche sizes, e.g., by applying 90% of the $300,000 to senior tranche 701, and 2% to each of tranches 702-706. Other distribution schemes may be used.

In some embodiments, different distribution schemes may be used depending on the period of time. For example, for the first five years after synthetic reference obligation 700 is created, all principal payments would be applied to senior tranche 701, but after that, payments could be distributed among all of the tranches. In this example, the first 5 years of principal applied only to senior tranche 701 are represented as principal region 711.

In other embodiments, different time periods can be used for each tranche, e.g. senior tranche 701 could get all principal in the first five years, for the next five years principal could be divided equally with mezzanine tranche 702, for the next five divided three ways with mezzanine tranches 702 and 703, etc. In some embodiments, junior tranche 706 is locked out from ever receiving principal payments. In this embodiment, principal region 717 would not exist.

In one embodiment, synthetic reference structure 700 can be conceptualized as a bond, where the underlying collateral has an average interest rate analogous to a bond's interest rate, e.g. the average rate in pool-level disclosures table 600 for group 2 is 10%. Especially in the case of ARM loans, insurers may be reticent to obligate themselves on the bottom tranche—the risk of defaults may be too great.

To offset this risk, synthetic reference structure 700 may be arranged to allocate some portion of the interest payments to pay down junior tranche 706. For example, the premiums for the obligations under synthetic reference structure 700 may be priced based on 7% of the total underlying balance in group 2. Since the average rate for these loans is 10%, there is an additional 3% of interest that the lender is not paying out in premiums. This remaining 3% can be applied to junior tranche 706. Thus, while the lender would not be insured on junior tranche 706, they could allocate the difference between their premiums to the insurers and the actual interest rate on the loans to insulate themselves from obligations in junior tranche 706. Thus, even if principal payments are locked out from junior tranche 706, the 3% interest differential can be applied to principal region 717.

Obligation engine 113 can implement any of the principal reduction strategies discussed above by applying any reduction in principal to the respective tranches of synthetic reference structure 300 or 700. In some embodiments, obligation engine 113 receives indications of any principal reduction on a loan from automated billing software on lender terminal 110. Obligation engine 113 can thus effectively account not only for built-up losses in each tranche, but can move the ceiling for each tranche down to reduce the maximum exposure for any tranche receiving applied principal.

Other Parties

In less complex embodiments, contracts on synthetic reference structures 300 and 700 are executed directly between the lender and insurers 1 and 2. However, the complexity of the financial marketplace is such that many other parties may have some role in the use and administration of the synthetic reference structure.

For example, the examples above assumed that the lender owning the underlying loans made the contracts based on the synthetic reference structure. In other embodiments, any entity that has sufficient loan-level information about a group of loans can create a synthetic reference structure consistent with principles of the invention. For example, a financial institution that services, but does not own, a number of loans may create a synthetic reference structure for those loans. Such an institution could also make public the loan- and pool-level disclosures discussed above.

Further, in some embodiments as discussed above, market participants other than lenders such as mortgage insurers and junior lienholders may wish to execute contracts based on the synthetic reference structure. In some embodiments, these contracts may be with the same insurers that the lender purchased protection from.

Because the lender will frequently be both purchasing protection on the loans and maintaining the loan level data, the insurers may want assurance that the lender is being honest in the loan and pool level disclosures. A neutral third-party such as a trustee can provide assurance auditing the underlying loan data and verifying the disclosures in loan table 400 and pool-level disclosures table 600. A trustee may also verify the credit events that trigger the obligations, and verify or provide the BPO or other estimate of property value.

Credit rating agencies perform certain roles in the marketplace, such as rating the quality of investments. In some embodiments, each tranche in a synthetic reference structure may be rated by a credit rating agency, like a bond—AAA through D. This credit rating may be used by an insurer to assess the risk of insuring a tranche and evaluate the likelihood of profiting from premiums in relation to the obligations likely to be incurred for a given tranche.

As a source of information for rating the tranches, the credit rating agency could use the disclosures of loan table 400 and pool-level disclosures table 600. In some embodiments, the credit rating agency may be provided with historical data for the loans from the group underlying a synthetic reference structure, or for similar loans. This historical data may be provided in conjunction with tables 400 and 600, or may only be available to the credit rating agency. Based on this historical data, the credit rating agency may specify certain tranche sizes that are necessary for a given tranche to achieve a particular rating, and the synthetic reference structure may be adjusted accordingly.

For example, the credit rating agency may consider the rules for applying principal to the respective tranches in a synthetic reference structure ("subordination levels"), along with the underlying loan pool disclosures, to determine the credit exposure for an insurer on each tranche in the synthetic reference obligation. In some embodiments, the credit rating agency will also determine the subordination levels. Based on this determination, the credit rating agency may require the senior tranche to comprise 90% of the total loan value and receive all principal for the first 5 years in order to qualify for a AAA credit rating. The credit rating agency can perform similar steps for the mezzanine tranches as well as the junior tranche. Typically, mezzanine tranches will have lower credit ratings than the senior tranche, and the junior tranche will have either the lowest credit rating or remain unrated.

Network Implementation

As shown in the embodiment of FIG. 1, in addition to the lender and insurers, each of the additional parties discussed above can operate one or more terminals connected to network 150. For example, the trustee may operate a trustee terminal 140. Trustee terminal 140 may publish a loan table 400 and a pool-level disclosure table 600, along with synthetic reference structures 300 and 700. Thus, insurer 1 and 2 will have an independent source from which to get this data.

In the embodiment shown, trustee terminal 140 may also include an obligation engine 141. Obligation engine 141 may perform the same operations associated with obligation engine 113. In particular, because the trustee is a trusted third party, it may be useful to have obligation engine 141 on trustee terminal 140 calculate the obligations due by insurers 1 and 2, and to provide them with an electronic bill reflecting these obligations.

Trustee terminal 140 may also provide a monthly report on each synthetic reference structure. The report could include, for example, delinquency data, as well as monthly updated credit scores for the borrowers in each group. In other embodiments, the credit scores are fixed when a synthetic reference structure is created and are not updated monthly. These credit scores may have been obtained when the loan was first made, or, if these scores were relatively old when the corresponding synthetic reference structure was created, the scores may have been updated at that time but not afterwards.

A mortgage insurer may also operate a terminal 180 to obtain data over network 150. Similarly, a junior lienholder might operate a terminal 160 on network 150. Both parties may communicate with one or more of lender terminal 110 and trustee terminal 140 to monitor the status of any synthetic reference structure, as well as underlying loan and pool level data. Lender terminal 110 or trustee terminal 140 may also send electronic bills to mortgage insurer terminal 180 and junior lienholder terminal 170 for their premiums, and to insurer 1 terminal 120 and insurer 2 terminal 130 for any incurred obligations. In some embodiments, lender terminal 110 or trustee terminal 140 may include automated billing software which causes a paper bill to be mailed to any obligated party, rather than or in addition to an electronic bill. Other forms of billing may be used.

A broker may operate a broker terminal 170 on network 150. The broker may sell interests in synthetic reference structures on behalf of the lender. Insurer terminals 120 and 130, mortgage insurance terminal 180, and junior lienholder terminal 160 may request information about available synthetic reference structures from the broker, and broker terminal 170 may respond with information provided by the lender or trustee, such as tables 400 and 700, synthetic reference structures 300 and 600, and any credit agency ratings of the various tranches.

In some embodiments, broker terminal 170 will have stored information indicating premiums available from the lender, junior lienholder, and mortgage insurer for agreeing to incur obligations under a given synthetic reference structure. Broker terminal 170 may receive an electronic request over network 150 to incur such an obligation, and communicate with lender terminal 110 or trustee terminal 140 that the obligation has been incurred. Once lender terminal 110 or trustee terminal 140 receives such an indication, obligation engines 113/141 may execute steps S204-S206 to determine if obligations are triggered based on the agreements between the various parties.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method executed by at least one processor having access to a first network database and a second network database via a network interface, the method comprising:
   storing, by a software program module integrated into the at least one processor in the first network database, data reflecting a plurality of secured loans, each of the secured loans being secured by collateral and each of the secured loans having an outstanding balance;
   calculating, by the software program module integrated into the at least one processor, a combined value for the secured loans by totaling the outstanding balances;
   determining, by the software program module integrated into the at least one processor, at least one scaling factor based on:
      a predetermined number of loans in a subset of the secured loans, the loans in the subset having at least one attribute in common; and
      a risk associated with the secured loans;
   storing, by the software program module integrated into the at least one processor in the second network database, data representing a synthetic reference structure based on the secured loans, the synthetic reference structure having a plurality of tranches, each of the tranches in the plurality of tranches having a value for triggering an obligation, each value for triggering an obligation for each tranche being proportioned by one of the scaling factors;
   receiving, from an automatic payment monitoring system connected to the software program module integrated into the at least one processor via the network interface, information indicating that a credit event has occurred for a loan in the plurality of secured loans;
   calculating, by the software program module integrated into the at least one processor, a loss amount for the loan at least in part by calculating a difference between an unpaid balance on the loan and a pre-foreclosure value of the collateral of the loan;
   updating, by the automatic payment monitoring system in the second network database, at least one tranche in the plurality of tranches based on the loss amount, the update being performed using a predefined loss formula when a delinquent loan is removed from the secured loans underlying the synthetic reference structure;
   determining, using the software program module integrated into the at least one processor, whether the loss amount causes an aggregation of losses to exceed the value for triggering the obligation associated with a tranche in the plurality of tranches;
   if the aggregation of losses exceeds the value for triggering the obligation, then demanding, via the software program module, a payment based on the obligation associated with the tranche, wherein the payment demand comprises an electronic request sent via the network interface, the electronic request including an indication that the obligation associated with the tranche has been incurred and further including an indication of a payment amount determined by scaling the obligation associated with the tranche by the at least one scaling factor; and
   configuring a visual user interface accessible over a network interface in communication with the at least one processor to provide a web page including a visual representation of the synthetic reference structure based on the secured loans, wherein the visual representation is updated each time information indicating that a credit event has occurred for a loan in the plurality of secured loans is received, the update including changes to one tranche in the plurality of tranches when the loss amount causes an aggregation of losses to exceed the value for triggering the obligation associated with a tranche in the plurality of tranches.

2. The computer-implemented method according to claim 1, further comprising:

assigning a credit rating to at least some the plurality of tranches, each of the credit ratings representing a loss exposure represented by the corresponding tranche.

3. The computer-implemented method according to claim 2, wherein the credit rating for the credit-rated tranches are based at least in part on subordination levels for the credit-rated tranches.

4. The computer-implemented method according to claim 1, wherein calculating the loss amount further comprises:
applying a fixed percentage to the outstanding balance on the loan.

5. The computer-implemented method according to claim 1, wherein the pre-foreclosure value is estimated using an independent broker price opinion (BPO) for the collateral.

6. The computer-implemented method according to claim 5, wherein the independent BPO is scaled by a foreclosure discount.

7. The computer-implemented method according to claim 1, wherein the pre-foreclosure value for the collateral securing the loan is estimated based on a price index for similar collateral.

8. A system comprising:
a processor having access to a first network database and a second network database;
a network interface in communication with the processor; and
a memory device in communication with the processor and configured to store instructions,
wherein, when the processor executes the instructions, the processor:
stores, via a software program module integrated into the processor in the first network database, data reflecting a plurality of secured loans, each of the secured loans being secured by collateral and each of the secured loans having an outstanding balance;
calculates, via the software program module integrated into the processor, a combined value for the secured loans by totaling the outstanding balances;
determines, via the software program module integrated into the processor, at least one scaling factor based on:
a predetermined number of loans in a subset of the secured loans, the loans in the subset having at least one attribute in common; and
a risk associated with the secured loans;
stores, via the software program module integrated into the processor in the second network database, data representing a synthetic reference structure based on the secured loans, the synthetic reference structure having a plurality of tranches, each of the tranches in the plurality of tranches having a value for triggering an obligation, each value for triggering an obligation for each tranche being proportioned by one of the scaling factors;
receives, from an automatic payment monitoring system connected to the software program module integrated into the processor via the network interface, information indicating that a credit event has occurred for a loan in the plurality of secured loans;
calculates, via the software program module integrated into the processor, a loss amount for the loan at least in part by calculating a difference between an unpaid balance on the loan and a pre-foreclosure value of the collateral of the loan;
updates, by the automatic payment monitoring system in the second network database, at least one tranche in the plurality of tranches based on the loss amount, the update being performed using a predefined loss formula when a delinquent loan is removed from the secured loans underlying the synthetic reference structure;
determines, via the software program module integrated into the processor, whether the loss amount causes an aggregation of losses to exceed the value for triggering the obligation associated with a tranche in the plurality of tranches;
if the aggregation of losses exceeds the value for triggering the obligation, then demanding, via the software program module, a payment based on the obligation associated with the tranche, wherein the payment demand comprises an electronic request sent via the network interface, the electronic request including an indication that the obligation associated with the tranche has been incurred and further including an indication of a payment amount determined by scaling the obligation associated with the tranche by the at least one scaling factor; and
configures a visual user interface accessible over the network interface to provide a web page including a visual representation of the synthetic reference structure based on the secured loans, wherein the visual representation is updated each time information indicating that a credit event has occurred for a loan in the plurality of secured loans is received, the update including changes to one tranche in the plurality of tranches when the loss amount causes an aggregation of losses to exceed the value for triggering the obligation associated with a tranche in the plurality of tranches.

9. The system according to claim 8, wherein the processor further executes the instructions to:
assign a credit rating to at least some the plurality of tranches, each of the credit ratings representing a loss exposure represented by the corresponding tranche.

10. The system according to claim 9, wherein the credit rating for the credit-rated tranches are based at least in part on subordination levels for the credit-rated tranches.

11. The system according to claim 8, wherein calculating the loss amount further comprises:
applying a fixed percentage to the outstanding balance on the loan.

12. The system according to claim 8, wherein the pre-foreclosure value is estimated using an independent broker price opinion (BPO) for the collateral.

13. The system according to claim 12, wherein the independent BPO is scaled by a foreclosure discount.

14. The system according to claim 8, wherein the pre-foreclosure value for the collateral securing the loan is estimated based on a price index for similar collateral.

15. A non-transitory computer-readable medium storing instructions, which, when executed by at least one processor having access to a first network database and a second network database via a network interface, cause the at least one processor to perform a method comprising:
storing, by a software program module integrated into the at least one processor in the first network database, data reflecting a plurality of secured loans, each of the secured loans being secured by collateral and each of the secured loans having an outstanding balance;
calculating, by the software program module integrated into the at least one processor, a combined value for the secured loans by totaling the outstanding balances;

determining, by the software program module integrated into the at least one processor, at least one scaling factor based on:
  a predetermined number of loans in a subset of the secured loans, the loans in the subset having at least one attribute in common; and
  a risk associated with the secured loans;
storing, by the software program module integrated into the at least one processor in the second network database, data representing a synthetic reference structure based on the secured loans, the synthetic reference structure having a plurality of tranches, each of the tranches in the plurality of tranches having a value for triggering an obligation, each value for triggering an obligation for each tranche being proportioned by one of the scaling factors;
receiving, from an automatic payment monitoring system connected to the software program module integrated into the at least one processor via the network interface, information indicating that a credit event has occurred for a loan in the plurality of secured loans;
calculating, by the software program module integrated into the at least one processor, a loss amount for the loan at least in part by calculating a difference between an unpaid balance on the loan and a pre-foreclosure value of the collateral of the loan;
updating, by the automatic payment monitoring system in the second network database, at least one tranche in the plurality of tranches based on the loss amount, the update being performed using a predefined loss formula when a delinquent loan is removed from the secured loans underlying the synthetic reference structure;
determining, by the software program module integrated into the at least one processor, whether the loss amount causes an aggregation of losses to exceed the value for triggering the obligation associated with a tranche in the plurality of tranches;
if the aggregation of losses exceeds the value for triggering the obligation, then demanding, via the software program module, a payment based on the obligation associated with the tranche, wherein the payment demand comprises an electronic request sent via the network interface, the electronic request including an indication that the obligation associated with the tranche has been incurred and further including an indication of a payment amount determined by scaling the obligation associated with the tranche by the at least one scaling factor; and
configuring a visual user interface accessible over a network interface in communication with the at least one processor to provide a web page including a visual representation of the synthetic reference structure based on the secured loans, wherein the visual representation is updated each time information indicating that a credit event has occurred for a loan in the plurality of secured loans is received, the update including changes to one tranche in the plurality of tranches when the loss amount causes an aggregation of losses to exceed the value for triggering the obligation associated with a tranche in the plurality of tranches.

16. The non-transitory computer-readable medium according to claim 15, the method further comprising:
  assigning a credit rating to at least some the plurality of tranches, each of the credit ratings representing a loss exposure represented by the corresponding tranche.

17. The non-transitory computer-readable medium according to claim 16, wherein the credit rating for the credit-rated tranches are based at least in part on subordination levels for the credit-rated tranches.

18. The non-transitory computer-readable medium according to claim 15, wherein calculating the loss amount further comprises:
  applying a fixed percentage to the outstanding balance on the loan.

19. The non-transitory computer-readable medium according to claim 15, wherein the pre-foreclosure value is estimated using an independent broker price opinion (BPO) for the collateral.

20. The non-transitory computer-readable medium according to claim 19, wherein the independent BPO is scaled by a foreclosure discount.

21. The non-transitory computer-readable medium according to claim 15, wherein the pre-foreclosure value for the collateral securing the loan is estimated based on a price index for similar collateral.

* * * * *